(12) United States Patent
Croxford et al.

(10) Patent No.: US 10,235,738 B2
(45) Date of Patent: Mar. 19, 2019

(54) METHOD OF AND APPARATUS FOR DISPLAYING AN OUTPUT SURFACE IN DATA PROCESSING SYSTEMS

(71) Applicant: ARM LIMITED, Cambridge, Cambridgeshire (GB)

(72) Inventors: Daren Croxford, Cambridge (GB); Tom Cooksey, Cambridge (GB); Lars Ericsson, Cambridge (GB)

(73) Assignee: ARM Limited, Cambridge (GB)

( * ) Notice: Subject to any disclaimer, the term of this patent is extended or adjusted under 35 U.S.C. 154(b) by 184 days.

(21) Appl. No.: 15/103,070

(22) PCT Filed: Dec. 11, 2014

(86) PCT No.: PCT/GB2014/053668
§ 371 (c)(1),
(2) Date: Jun. 9, 2016

(87) PCT Pub. No.: WO2015/087078
PCT Pub. Date: Jun. 18, 2015

(65) Prior Publication Data
US 2016/0314557 A1 Oct. 27, 2016

(30) Foreign Application Priority Data

Dec. 11, 2013 (GB) .................................. 1321896.1
Apr. 17, 2014 (GB) .................................. 1406973.6
Jul. 15, 2014 (GB) .................................. 1412522.3

(51) Int. Cl.
*G06T 1/60* (2006.01)
*G09G 5/393* (2006.01)
(Continued)

(52) U.S. Cl.
CPC ............... *G06T 1/60* (2013.01); *G09G 5/022* (2013.01); *G09G 5/14* (2013.01); *G09G 5/363* (2013.01);
(Continued)

(58) Field of Classification Search
None
See application file for complete search history.

(56) References Cited

U.S. PATENT DOCUMENTS 5,255,361 A * 10/1993 Callaway .............. G06F 3/1415
345/502
6,359,625 B1 3/2002 Perego
(Continued)

FOREIGN PATENT DOCUMENTS

GB 2 474 114 4/2011

OTHER PUBLICATIONS

International Search Report and Written Opinion of the International Searching Authority dated Jul. 20, 2017 in PCT/GB2014/053668, 11 pages.
(Continued)

*Primary Examiner* — Kyle Zhai
(74) *Attorney, Agent, or Firm* — Nixon & Vanderhye P.E.

(57) ABSTRACT

A display controller provides an output frame to a display for display by sending respective output surface regions that together form the output frame, each respective region of the output surface being generated from a respective region or regions of one or more input surfaces, to the display. When a new version of an output surface region is generated, the display controller determines whether the output surface region has been unchanged for a period, and if it has, then stores the generated output surface region in a frame buffer. Then, for the subsequent frame, checks are performed to see if the output surface region could have changed. If there is
(Continued)

no change the stored version of the output surface region is reused, but if there is a change in the output surface region, the output surface region is regenerated.

20 Claims, 10 Drawing Sheets

(51) Int. Cl.
    *G09G 5/02*            (2006.01)
    *G09G 5/14*            (2006.01)
    *G09G 5/36*            (2006.01)

(52) U.S. Cl.
    CPC .... *G09G 5/393* (2013.01); *G06T 2207/20021* (2013.01); *G09G 2320/103* (2013.01); *G09G 2330/021* (2013.01); *G09G 2330/022* (2013.01); *G09G 2350/00* (2013.01); *G09G 2360/18* (2013.01)

(56) References Cited

U.S. PATENT DOCUMENTS

| | | | |
|---|---|---|---|
| 8,988,443 B2 | 3/2015 | Croxford et al. | |
| 9,182,934 B2 | 11/2015 | Croxford et al. | |
| 9,195,426 B2 | 11/2015 | Croxford et al. | |
| 9,406,155 B2 | 8/2016 | Oterhals et al. | |
| 2008/0143695 A1* | 6/2008 | Juenemann | G09G 3/3611 345/204 |
| 2008/0186319 A1 | 8/2008 | Boner | |
| 2011/0074765 A1 | 3/2011 | Oterhals et al. | |
| 2012/0268480 A1 | 10/2012 | Cooksey et al. | |
| 2016/0021384 A1 | 1/2016 | Croxford et al. | |

OTHER PUBLICATIONS

International Preliminary Report on Patentability dated Jun. 23, 2016 in PCT/GB2014/053668, 7 pages.
UK Search Report dated Jun. 12, 2014 in GB 1321896.1, 4 pages.
UK Search Report dated Oct. 16, 2014 in GB 1406973.6, 4 pages.
UK Search Report dated Jan. 15, 2015 in GB 1412522.3, 4 pages.
UK Search Report dated Jun. 1, 2015 in GB 1422033.9, 4 pages.
T. Heade et al, "HDR Image Composition and Tone Mapping on the Cell Processor" Eurographics Ireland Workshop Series, Trinity College Dublin, Dec. 11, 2009, 8 pages.
J. Bergsagel et al, "Super high resolution displays empowered by the OMAP4470 mobile processor" Jan. 2012, pp. 1-17.
M.H. Khan et al, "Bandwidth-efficient Display Controller for Low Power Devices in Presence of Occlusion" International Conference on Consumer Electronics, Digest of Technical Papers, Jan. 10-14, 2007, 2 pages.
W.-C. Park et al, "Order Independent Transparency for Image Composition Parallel Rendering Machines" Asia-Pacific Conference on Advances in Computer Systems Architecture, Aug. 23-25, 2004, pp. 449-460.
"Quick look at the Texas Instruments TI OMAP 4470 CPU, Kindle Fire HD CPU" Sep. 6, 2012, 8 pages.
http://www.vivantecorp.com/TICW2.html.
International Search Report for PCT/GB2014/053668, dated Jul. 20, 2015, 5 pages.

* cited by examiner

This application is the U.S. national phase of International Application No. PCT/GB2014/053668 filed 11 Dec. 2014, which designated the U.S. and claims priority to GB Patent Application Nos. 1321896.1 filed 11 Dec. 2013, 1406973.6 filed 17 Apr. 2014, and 1412522.3 filed 15 Jul. 2014, the entire contents of each of which are hereby incorporated by reference.

BACKGROUND

The technology described herein relates to a method of and an apparatus for providing an output surface (such as a window to be displayed) that is composited (generated) from one or more input surfaces (such as input windows) in data processing systems.

Many known electronic devices and systems use windows for displaying information, such as a graphical user interface, game, demo, etc., to a user on a display screen (and for allowing a user to interact with an application or applications being executed).

A common way of providing such windows is to use a compositing window system, in which individual input windows are combined appropriately (i.e. composited) and the result is written out to a frame buffer, which is then read by a display controller for the display in question in order to display the windows to the user. Since such systems write out to a frame buffer and this buffer is then read for display, they are often referred to as frame buffer composition systems.

An example of this frame buffer composition process is shown in FIG. 1. In this process, input surfaces 1a, 1b, 1c are read and passed to a composition engine 3 which combines the input surfaces 1a-c to generate a composited output frame. At step 5 the composited output frame is written to a buffer and then at step 7 the composited output frame is read from the buffer by a display controller 9, which then sends the composited output frame to a display for display.

A frame buffer composition system is shown in FIG. 2. This comprises a central processing unit (CPU) 10, a graphics processing unit (GPU 11), a composition engine 12, a display controller 9 and a memory controller 14. As shown in FIG. 2, these communicate via an interconnect 13. The memory controller also has access to an off-chip memory 15 for storing the composited frame buffer. The composition engine 12 generates the composited output frame from one or more input surfaces (e.g. generated by the GPU 11) and the composited output frame is then stored, via the memory controller 14, in a frame buffer in the off-chip memory 15. The display controller 9 then reads the composited output frame from the frame buffer in the off-chip memory 15 via the memory controller 14 and sends it to a display for display.

As well as such frame buffer composition systems, there also exist direct composition systems, in which a composited frame is generated from input surfaces (windows) and then output to a display directly (i.e. not via intermediate storage in a frame buffer).

An example of a direct composition process is shown in FIG. 3. Compared with the frame buffer composition process shown in FIG. 1, in this direct composition process, the composited frame is not written to a buffer or read therefrom. Rather, a compositing display controller 8 generates the composite frame from the input surfaces 1a-c and then sends the composited frame on for display, without storing it in a buffer first.

A direct composition system is shown in FIG. 4. Compared with the frame buffer system shown in FIG. 2, in the direct composition system the composition engine 12 and display controller 9 are replaced with a single compositing display controller 8 which generates the composited frame from the input surfaces and then sends the composited frame straight on for display, without storing it in a buffer first.

The Applicant believes that there remains scope for improvements to compositing window systems.

BRIEF DESCRIPTION OF THE DRAWINGS

Embodiments of the technology described herein will now be described by way of example only and with reference to the accompanying drawings, in which.

Like reference numerals are used for like features throughout the drawings, where appropriate.

DETAILED DESCRIPTION

Figure 1:
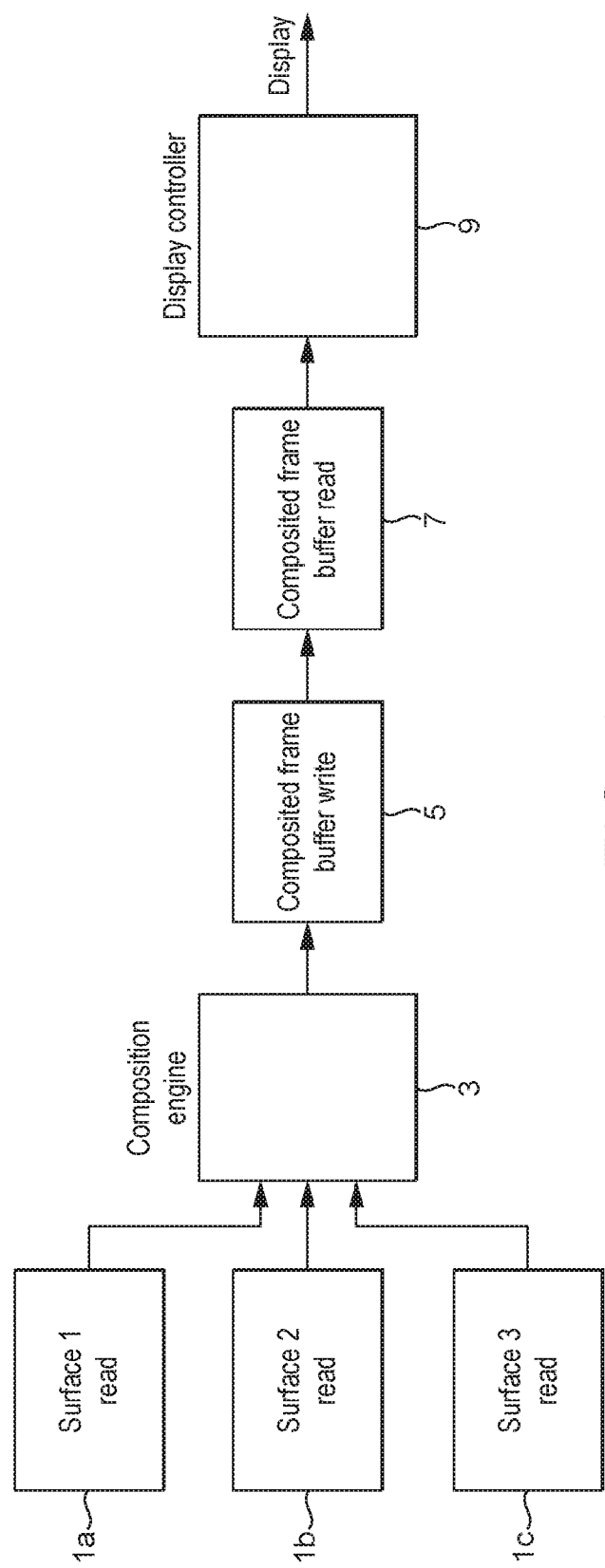
FIG. 1 is a diagram illustrating a frame buffer composition process.

One embodiment of the technology described herein comprises a method of providing an output surface, the output surface comprising one or more regions that together form the output surface, each respective region of the output surface being generated from a respective region or regions of one or more input surfaces; the method comprising:

when a new version of an output surface is to be provided, for at least one region of the output surface:

checking whether a previously generated version for the at least one region of the output surface is stored in a buffer; and if a previously generated version for the at least one region of the output surface is not stored in the buffer:

reading in the respective region or regions of the one or more input surfaces from which the at least one region of the output surface is to be generated, and generating a new version of the at least one region of the output surface from the respective region or regions of the one or more input surfaces;

determining whether the at least one region of the output surface is likely to change; and if it is determined that the at least one region of the output surface is unlikely to change:

sending the new version of the at least one region of the output surface for use and writing the new version of the at least one region of the output surface to the buffer.

Another embodiment of the technology described herein comprises a system for providing an output surface, the output surface comprising one or more regions that together form the output surface, each respective region of the output surface being generated from a respective region or regions of one or more input surfaces; the system comprising:

a buffer; and a compositing display controller;

and wherein the compositing display controller is configured to, when a new version of an output surface is to be provided, perform the following steps for at least one region of the output surface:

check whether a previously generated version for the at least one region of the output surface is stored in the buffer; and if a previously generated version for the at least one region of the output surface is not stored in the buffer:

read in the respective region or regions of the one or more input surfaces from which the at least one region of the output surface is to be generated, and generate a new version of the at least one region of the output surface from the respective region or regions of the one or more input surfaces;

determine whether the at least one region of the output surface is likely to change;

and if it is determined that the at least one region of the output surface is unlikely to change:

send the new version of the at least one region of the output surface for use and write the new version of the at least one region of the output surface to the buffer.

The technology described herein relates to a compositing window system, i.e. in which one or more input surfaces are composited (combined) to provide an output surface, e.g. for display. Like in direct composition systems, the system, e.g., compositing display controller, can generate an output surface from its respective input surface(s) and send the so-generated output surface for use (e.g. display) without having to first store the output surface in a frame buffer.

However, in the technology described herein, when a region of an output surface is generated in this manner, it is also determined whether the respective output surface region is likely to change. If it is determined that the respective output surface region is unlikely to change, then as well as sending the generated output surface region for use, the generated output surface region is also stored in (written to) a buffer. As will be discussed further below, the so-stored region of the output surface may then be reused from the buffer when a new version of the output surface is to be provided (if it is appropriate to do that), thereby avoiding the need to generate the region again for the new version of the output surface.

However, where it is determined that the region of the output surface is likely to change (and so is unlikely to be able to be reused for subsequent versions of the output surface), then the region of the output surface may be generated from the appropriate input surface regions without also writing the output surface region to a buffer.

The effect of this then is that the technology described herein can, in effect, and as will be discussed further below, provide a "hybrid" window compositing system which can, in effect, select between using frame buffer composition and direct composition on an output surface region-by-region basis. This can then facilitate reductions in bandwidth and power consumption for display composition. This may be particularly desirable and advantageous in the context of compositing window systems and displays for lower-powered, and/or mobile devices.

For example, the Applicant has recognised that direct display controller composition will reduce bandwidth as compared to frame buffer composition as a frame buffer isn't read and written. However, where it would be possible to re-use a previously generated output surface region for a new version of the output surface, then it can be more effective and use less bandwidth to reuse a previously stored version of the output surface region rather than directly composing the output surface region anew for the new version of the output surface. As will be discussed further below, the technology described herein facilitates such operation by effectively dynamically selecting the most appropriate scheme to use on an output surface region-by-region basis.

The input surface or surfaces and the output surface in the technology described herein may be any suitable and desired such surfaces. As will be appreciated from the above, in one embodiment the technology described herein is used in a compositing window system, and so the input surface or surfaces are an input window or windows (to be displayed), and the output surface is an output frame (composited window) for display.

However, other arrangements would be possible. For example, the output surface could be some intermediate window that is then itself to be composed with other windows into a final output window (frame), or the output surface could, e.g. be some form of data structure, such as a graphics texture, that is intended to be used in further, e.g., graphics, processing.

Thus, providing or sending an output surface for use may comprise sending it for display (e.g. to a display for display) and/or sending it for use in (e.g. further) graphics processing (e.g. in the case that the output surface is an intermediate window and/or a data structure such as a graphics texture), In an embodiment, the input and output surfaces are all images, e.g. frames for display.

The input surfaces can be generated as desired, for example by being appropriately rendered and stored into a buffer by a graphics processing system (a graphics processor), as is known in the art. In a compositing window system, the input surface windows may be, e.g., for a game, a demo, a graphical user interface (GUI), a GUI with video data (e.g. a video frame with graphics "play back" and "pause" icons), etc., as is known in the art.

The output surface can correspondingly be generated from the input surface or surfaces as desired, for example by blending or otherwise combining the input surfaces. The process can also involve applying transformations (skew, rotation, scaling, etc.) to the input surface or surfaces, if desired.

There may only be one input surface that is being used to generate the output surface, but in an embodiment there are plural (two or more) input surfaces that are being used to generate the output surface.

The input surfaces and the output surfaces may have the same or different sizes.

There may only be a single region from an (or from each) input surface that contributes to the output surface region, or there may be two or more regions of the, or of one or more of the, input surfaces that contribute to the output surface region.

The regions of the input and output surfaces that are considered and used in the technology described herein could simply comprise the entire surface or surfaces in question (e.g. frame or window to be displayed) (and in one embodiment, this is the case). In this case, the surface in question will comprise a single region only, and the switching between the different composition schemes will accordingly be performed on a full-frame basis.

In an embodiment each region comprises a portion (some but not all) of the surface in question (i.e. the surface or surfaces are divided into a plurality of regions). In this case the regions of the input and output surfaces can each represent any suitable and desired region (area) of the surface in question. So long as the surface in question is able to be divided or partitioned into a plurality of identifiable smaller regions each representing a part of the overall surface that can be identified and processed in the manner of the technology described herein, then the sub-division of the surfaces into regions can be done as desired.

In some embodiments, the regions correspond to respective blocks of data corresponding to respective parts of the overall array of data that represents the surface in question (as is known in the art, the surfaces will typically be represented as, and stored as, arrays of sampling position or pixel data).

All the surfaces can be divided into the same size and shape regions (and in at least one embodiment this is done), or, alternatively, different surfaces could be divided into different sized shapes and regions (for example the input surface or surfaces could use one size and shape region, whereas the output surface could use another size and shape region).

The region size or sizes that are used may also depend upon the process whereby the input surfaces are combined to generate the output surface (for example if there is any form of scaling as between the input surface or surfaces and the output surface).

Each surface region (e.g. block of data) in an embodiment may represent a different part (region) of the surface (data overall array) (although the regions could overlap if desired). Each region (data block) should ideally represent an appropriate portion (area) of the surface (data array), such as a plurality of data positions within the surface. Suitable region sizes could be, e.g., 8×8, 16×16 or 32×32 data positions in the surface data array.

In some embodiments, the surfaces are divided into regularly sized and shaped regions (e.g. blocks of data), for example in the form of squares or rectangles. However, this is not essential and other arrangements could be used if desired.

In some embodiments, each surface region corresponds to a rendered tile that a graphics processor or video engine or composition engine or compositing display controller that is rendering or generating the surfaces produces as its rendering or composition output. This is a particularly straightforward way of implementing the technology described herein, as the graphics processor, display engine or controller will generate the tiles directly, and so there will be no need for any further processing to "produce" the surface regions that will be considered in the manner of the technology described herein.

(As is known in the art, in tile-based rendering, the two dimensional output array or frame of the rendering process (the "render target") (e.g., and typically, that will be displayed to display the scene being rendered) is sub-divided or partitioned into a plurality of smaller regions, usually referred to as "tiles", for the rendering process. The tiles (regions) are each rendered separately (typically one after another). The rendered tiles (regions) then form the complete output array (frame) (render target), e.g. for display.

Other terms that are commonly used for "tiling" and "tile based" rendering include "chunking" (the regions are referred to as "chunks") and "bucket" rendering. The terms "tile" and "tiling" will be used herein for convenience, but it should be understood that these terms are intended to encompass all alternative and equivalent terms and techniques.)

In these arrangements of the technology described herein, the tiles that the surfaces are divided into for rendering and/or composition purposes can be any desired and suitable size or shape. The tiles in some embodiments are all the same size and shape, as is known in the art, although this is not essential. In some embodiments, each tile is rectangular (including square), and may be 8×8, 16×16, 32×32, 32×4 or 32×1 sampling positions in size. Non-square rectangular regions, such as 32×4 or 32×1 may be better suited for output to a display.

In some embodiments, the technology described herein may be also or instead performed using surface regions of a different size and/or shape to the tiles that the rendering, etc., process operates on (produces).

For example, in some embodiments, the surface regions that are considered in the manner of the technology described herein may be made up of a set of plural "rendering" tiles, and/or may comprise only a sub-portion of a rendering tile. In these cases there may be an intermediate stage that, in effect, "generates" the desired surface regions from the rendered tile or tiles that the graphics processor generates.

In the technology described herein, and as discussed above, when a new version of the output surface region is required, it is first checked if a previously generated (e.g. used) version for the region of the output surface is stored in the buffer.

In an example, it is first checked if a previously generated version of the (e.g. particular) region of the output surface is stored in the buffer.

Alternatively or additionally/secondly, it may be checked if a previously generated version of a different (e.g. adjacent) region of the output surface is stored in the buffer.

Thus, it may be checked if a previous version of the and/or of another region of the output surface is stored in the buffer such that, if a previous version of the and/or of the another region of the output surface is stored in the buffer, it may be considered for use (e.g. it may be determined whether or not that version is suitable for use).

This facilitates the (potential) reuse of output surface regions that have been stored in the buffer when a new version of the output surface is to be provided.

There may be multiple versions (frames) worth of input and/or output surface regions stored in a buffer. Any of these previous versions (frames) could be checked. Thus, the previously generated version for the region of the output surface that is being checked could be the immediately preceding generated version for the region of the output surface, and/or it could be one or more earlier versions. This means that even if the immediately preceding generated version for the region of the output surface was not stored (or is not valid), an earlier version may have been and it may be possible to use that earlier version.

In an embodiment, when it is checked if a previously generated (e.g. used) version for the region of the output surface is stored in the buffer, this comprises checking whether a previously generated (e.g. used) version of the particular region in question of the output surface that is to be provided is stored in the buffer (i.e. whether the corresponding output surface region from an earlier version of the output surface is stored in the buffer).

On the other hand, this step could also or alternatively comprise checking whether a (suitable) previously generated (e.g. used) version of a (any) (of a different) region of the output surface is stored in the buffer (e.g. different, for example adjacent, regions could be checked, for example in the case that a previously generated (e.g. used) version of the particular region of the output surface that is to be provided is not stored in the buffer). Thus, even if a previously generated (e.g. used) version of the region of the output surface that is to be provided is not stored in the buffer (or is not valid), there may be another region of the output surface stored in the buffer which could be used. In some embodiments, the input surface regions which contribute to the new version of the output surface may be compared with the input surface regions which contributed to the previously generated and stored version of an/the output surface region in order to determine whether or not the stored version of an/the output surface region is suitable for use, i.e. in the new version of the output surface. If the contributing input surface regions (e.g. their signatures) of the new version of the output surface and of the previously generated and stored version of an/the output surface region match, then the previously generated and stored version of an/the output surface region may be used.

Thus, in some embodiments, the respective region of regions of the one or more input surfaces from which the at least one region of the output surface is to be generated are compared with the respective region of regions of the one or more input surfaces from which a different region of the output surface was generated (e.g. the signatures corresponding to these regions of the one or more input surfaces may be compared). If the respective region of regions of the one or more input surfaces from which the at least one region of the output surface is to be generated are the same as the respective region of regions of the one or more input surfaces from which a different region of the output surface was generated, and the previously generated (e.g. used) version of the different region of the output surface corresponding to those input surface region or regions is stored in the buffer, then the previously generated (e.g. used) version of the different region of the output surface may be used for the at least one region of the output surface that is to be provided.

The determination of whether a previously generated (e.g. used) version for the region of the output surface is stored in the buffer may be performed as desired, but in an embodiment, a record, e.g. in the form of metadata such as one or more signatures, of the output surface regions that are stored in the buffer is maintained, and this record is checked to determine if a previous version for the output surface region is already stored in the buffer or not. It can be easier (e.g. quicker and/or requiring less power) to check data which indicates whether or not the (e.g. latest or earlier version of the) at least one region of the output surface is stored in the buffer, rather than checking the buffer itself.

For example, a particular metadata value, e.g. of "0", may indicate that a previously generated (used) version for the region of the output surface is not stored in the buffer, or that the stored version is "invalid" (i.e. relates to a version of the region of the output surface which does not correspond to that previously generated (used)). On the other hand, a particular metadata value, e.g. of "1", may indicate that a previously used version for the region of the output surface is stored in the buffer, or that the stored version is "valid" (i.e. relates to a version of the region of the output surface which corresponds to that previously generated (used)).

The metadata could be a signature, for example. Thus, a particular signature value, e.g. of "0" or "−999" or a different otherwise not used value, for example, could indicate that a previously generated (used) version for the region of the output surface is not stored in the buffer, or that the stored version is "invalid" (i.e. relates to a version of the region of the output surface which does not correspond to that previously generated (used)). On the other hand, any other signature value (i.e. other that the particular value) could indicate that a previously used version for the region of the output surface is stored in the buffer, or that the stored version is "valid" (i.e. relates to a version of the region of the output surface which corresponds to that previously generated (used)).

Stored metadata could also indicate which previously stored output surface region to use for the output region in question, e.g. which of many previous regions is/are valid. For example, the metadata could indicate the identity (e.g. position) of the region to be used.

Thus, in an embodiment, data (e.g. metadata) is stored which indicates whether or not the (previous or earlier version for the) at least one region of the output surface is stored in the buffer. In an example, such data, e.g. in the form of a flag, is stored for each respective region that the output surface is divided into. Thus, for example, a bitmap corresponding to the regions that the output surface is divided into may be stored, with the values in the bitmap indicating whether or not a previously used version of the corresponding region of the output surface is stored in the buffer or not.

Correspondingly, in an embodiment, if and when a region of the output surface is written to the buffer, the data indicating whether the at least one region of the output surface has been stored in the buffer is updated accordingly.

It will be appreciated in this regard that in some cases the buffer storing the output surface regions may store an outdated or superseded version of an output surface region (e.g. that was previously written to the buffer, but for which a newer version of the output surface region has been generated (and used) but not stored in the buffer). Thus the data which indicates whether or not the previously generated version for the at least one region of an output surface is stored in the buffer can, in effect, be considered to indicate whether the buffer contains a version of the output surface region that is valid for use for the current version of the output surface, or either doesn't store any version of the output surface region or stores a previous, but now invalid, version of the output surface region.

Thus, in an embodiment, the previously generated version of the output surface region is intended to refer to the version of the output surface region that is being used to display the form of the output surface region that is currently being displayed. This may, e.g., be the output surface region as it was generated for the version of the output surface (e.g. frame) currently being displayed, or it may be a version of the output surface region that was generated for an earlier version of the output surface (for an earlier frame), but which has been reused when displaying the current version of the output surface (for the frame currently being displayed).

Correspondingly, checking whether a previously generated version for the at least one region of an output surface is stored in the buffer may comprise checking whether the buffer contains a version of the output surface region that is valid for use for the current version of the output surface (and then if it is determined that the buffer does not contain a version of the output surface region that is valid for use for the current version of the output surface (e.g. either because the buffer doesn't store any version of the output surface or stores a previous, but now invalid, version of the output surface region), the input surface regions are read and the at least one region of the output surface is generated, etc.).

If it is determined that a previously used region of the output surface is not stored in the buffer (i.e. the buffer does not contain a version of the region of the output surface that is valid for (potential) reuse for the new version of the output surface that is being generated), then as discussed above, the region of the output surface is then generated, e.g. by the compositing display controller, from the respective input surface regions that contribute to the output surface in question, and the so-generated output surface region is sent for use.

It is also determined at this point whether the so-generated output surface region should be stored in the buffer (such that it would then be available for future use). This determination is performed by determining whether or not the region of the output surface is likely to change (in the future). This allows a decision to be made about whether to write the at least one region of the output surface to the buffer. The at least one region of the output surface may be written to the buffer only if it is determined that the at least one region of the output surface is unlikely to change in the future, i.e. it is likely to be static (as this would suggest that the output surface region is then likely to be able to be re-used for future versions of the output surface, such that there would then be a benefit in storing the generated at least one region of the output surface in the buffer).

In an embodiment, determining whether or not the region of the output surface is likely to change comprises determining whether the region of the output surface has changed, e.g. since the previous version of the output surface was generated and/or over a selected period, e.g. number of versions of the output surface. This is because if the at least one region of the output surface has changed (e.g. recently), then it may be assumed that it may be more likely to (continue to) change, for example, in the next frame or version of the output surface, than if the at least one region of the output surface has not changed recently.

In one embodiment, determining whether the at least one region of the output surface is likely to change comprises determining whether the respective region or regions of the one or more input surfaces that are to contribute to the at least one region of the output surface are likely to change. Again, this may be assessed by checking whether the respective region or regions of the one or more input surfaces has/have changed, e.g. since the previous version of the output surface was generated and/or over a selected period, e.g. number of versions of the output surface.

In some embodiments, checking whether the respective region or regions of the one or more input surfaces and/or the at least one region of the output surface has/have changed comprises checking whether there has been a change in the respective region or regions of the one or more input surfaces and/or the at least one region of the output surface over a certain, for example selected, preceding number of frames (e.g. 2 to 60 frames).

The certain preceding number of frames may be a fixed number (e.g. from 2 to 60 frames) or it may vary (e.g. from 2 to 60 frames).

In some embodiments, the certain preceding number of frames varies according to the number of input surfaces (e.g. for a smaller number of input surfaces, the certain preceding number of frames may be larger, and vice versa) and/or according to the probability that the at least one region of the output surface will change (e.g. for higher probabilities, the certain preceding number of frames may be smaller, and vice versa).

In some embodiments, the certain preceding number of frames varies according to an estimated or actual output buffer size (e.g. for a compressed output buffer). For example, for larger estimated or actual output buffer sizes, the certain preceding number of frames may be larger, and vice versa.

Alternatively or additionally, determining whether the respective region or regions of the one or more input surfaces and/or the at least one region of the output surface are likely to change comprises checking what the rate of change of the respective region or regions of the one or more input surfaces and/or the at least one region of the output surface is, e.g., over a certain, for example selected, preceding number of frames (e.g. 2 to 60 frames) and determining whether that rate is above or below a certain threshold. If the rate of change is below a certain threshold then this can indicate that the respective region or regions of the one or more input surfaces and/or the at least one region of the output surface are unlikely to change in the (near) future. On the other hand, if the rate of change is above that threshold (or equal to it, for example) then this could indicate that the respective region or regions of the one or more input surfaces and/or the at least one region of the output surface are likely to change.

The rate threshold could be an average modification rate of two frames or greater, for example.

The rate of change of the respective region or regions of the one or more input surfaces and/or the at least one region of the output surface could be determined or specified, for example, by software or calculated by looking at previous behaviour and extrapolating.

Alternatively or additionally, determining whether the respective region or regions of the one or more input surfaces and/or the at least one region of the output surface are likely to change comprises determining the periodicity or frequency or pattern of change and/or of updating of the respective region or regions of the one or more input surfaces and/or the at least one region of the output surface, e.g., over a certain, for example selected, preceding period of time, and/or over a certain, for example selected, preceding number of frames, and then using the determined update periodicity, etc., to determine whether the output surface region is going to change in the next frame or next few frames, for example. For example, where the pattern of updating the output frames indicates that an output surface region should not be updated for the next frame, then it may be concluded that the at least one region of the output surface is unlikely to change in the (near) future, and so should be stored, and vice-versa. Update periodicity data could be provided per output surface region, and then used to assess whether the output surface region in question is going to be updated in the next frame or not. This may be useful where, for example, the input surfaces change at a slower rate than is required for updating output frames to the display (for example when displaying video which is updated at 25 or 30 frames per second on a display having a display update rate of 60 frames per second).

Where used, the determination of whether respective region or regions of the one or more input surfaces and/or the at least one region of the output surface has/have changed can be performed as desired. This may be performed by comparing the respective versions of the region in question (e.g. by comparing the newly generated version of the at least one output region of the output surface with the previous version of the at least one region of the output surface (to see if the output surface region has changed)).

The comparison of the surface regions should be so as to determine whether the respective versions of the surface region are the same (or at least sufficiently similar) or not. This can be done in any suitable and desired manner. Thus, for example, some or all of the content of one version of the surface region may be compared with some or all of the content of another version (or versions) of the surface region (and in some embodiments this is done).

In some embodiments, the comparison is performed by comparing information representative of and/or derived from the content of the respective versions of the surface regions in question, to assess the similarity or otherwise of the respective surface regions. The information representative of the content of a respective surface region can take any suitable form, but in an embodiment is in the form of a "signature" for the surface region which is generated from or based on the content of the surface region (e.g. the data block representing the surface region). Such a region content "signature" may comprise, e.g., and in some embodiments, any suitable set of derived information that can be considered to be representative of the content of the region, such as a checksum, CRC, or a hash value, etc., derived from (generated for) the data for the surface region. Suitable signatures would include standard CRCs, such as CRC32, or other forms of signature such as MD5, SHA-1, etc. . . . .

Thus, in an embodiment, checking whether the respective region or regions of the one or more input surfaces and/or the at least one region of the output surface has/have changed comprises checking whether or not a signature or signatures for the one or more input surfaces and/or the at least one region of the output surface has/have changed. Comparing signatures for (i.e. representing) the surface regions can provide a quicker way of determining (e.g. in other steps) whether or not the surface region(s) have changed. It can also reduce memory bandwidth and power consumption.

The checking process may, e.g., require an exact match (e.g. of the respective signatures) for a surface region to be considered not to have changed, or only a sufficiently similar (but not exact) match, e.g., that exceeds a given threshold, could be required for the region to be considered not to have changed.

In an embodiment, to facilitate this operation, respective content representing signatures may be generated each time a surface region (e.g. an output surface region) is generated. The signatures may then be stored, e.g. in association with the surface region in question, to facilitate subsequent determinations of whether the surface region in question has changed.

Thus, in an embodiment, when the at least one output surface region is generated from the respective region or regions of the one or more input surfaces, in an embodiment a signature representative of the content of the at least one region of the output surface may also be generated and stored (e.g. in, or at least in association with, the output surface region buffer).

It should be noted here that in these arrangements content-representing signatures may be stored for all output surface regions that are generated, even if the generated output surface region is not stored in the buffer, so as to facilitate comparisons with subsequent versions of the output surface region.

The signature generation, where used, may be implemented as desired. For example, it may be implemented in an integral part of the compositing display controller that is generating the output surface, or there may, e.g., be a separate "hardware element" that does this. In cases where signatures are generated for the input surface regions, these may be generated by an input frame generator (e.g. a GPU or video engine).

If it is determined that the generated output surface region is unlikely to change, then, as discussed above, the generated output surface region is written to (stored in) the buffer. This may be performed as desired.

For example, the writing of the at least one region of the output surface to the buffer could be performed before or after sending it for use, or at the same time.

In some embodiments, writing the at least one region of the output surface to the buffer comprises writing a compressed representation of the at least one region of the output surface to the buffer. This can help to reduce the amount of data that needs to be stored and read.

In some embodiments, data representing the one or more input surface regions from which the at least one region of the output surface is generated is written to a buffer. This data may be or comprise signatures representing the one or more input surface regions.

In some embodiments, the data representing the one or more input surface regions may be compressed. This can also help to reduce the amount of data that needs to be stored and read.

On the other hand, in cases where the at least one region of the output surface is determined to be likely to change in the (near) future, the generated at least one region of the output surface may be sent for use without writing it to the buffer.

Thus, in cases where it is likely that there will be changes in the respective region or regions of the one or more input surfaces and/or the at least one region of the output surface in the (near) future, the at least one region of the output surface may be sent for use without storing it in a buffer for future use. This can help to save processing time and power in those cases where it is determined that the generated at least one output surface is unlikely to be able to be reused for future versions of the output surface. The above discusses the operation of the technology described herein in the situation where a "valid" previous version of the at least one region of the output surface is not stored in the buffer.

If a previously used version for the at least one region of the output surface is stored in the buffer (i.e. the buffer stores a version of the output surface region that is valid for use for the current version of the output surface), then while it would be possible simply to reuse, and e.g. display, that version of the at least one region of the output surface, in an embodiment it is first determined whether it is appropriate to reuse the version of the region of the output surface that is stored in the buffer. This may be done by determining whether the region of the output surface has or could have changed since the version of the region of the output surface that is stored in the output buffer was generated.

If it is determined that it is acceptable to reuse the stored version of the region of the output surface, then the stored region of the output surface may be provided from the buffer e.g. to the display for display (i.e. the at least one region of the output surface is not regenerated, but is simply read from the buffer).

On the other hand, if it is determined that the stored version of the at least one region of the output surface is not to be reused for the new version of the output surface, then the stored region of the output surface is not used for the new version of the output surface but instead a new version of the region of the output surface is generated from the respective region or regions of the one or more input surfaces that contribute to the region of the output surface and e.g. sent for display.

In this case, the so-generated region of the output surface may be used, e.g. sent for display, without also being written to the buffer. This is because since the previous stored version of the output surface region could not be reused, it is likely that the newly generated version will also be unable to be reused for future versions of the output surface. However, where appropriate, a signature representative of the content of the newly generated output may still be generated and stored (as discussed above).

Where a record, e.g. metadata such as a signature, indicating whether or not respective regions of the output surface are stored in the buffer is maintained, then that record, e.g. metadata, may appropriately be updated, e.g. either to indicate that the stored region of the output surface is still valid (is still present in the buffer) for future use, or whether, in the case where it has been determined that the stored version of the output surface region should not be reused, to indicate that the previously generated version of the region of the output surface is not stored in the buffer (i.e. in effect that the version of the output surface stored in the buffer is no longer valid).

The determination of whether it is appropriate to reuse the version of the region of the output surface that is stored in the buffer can be performed as desired. In an embodiment, it is based, at least in part, on whether the respective input surface or surfaces region or regions that will contribute to the output surface region have changed since the stored version of the output surface region was generated.

Thus, if a previous version of the at least one region of the output surface is stored in the buffer, an embodiment of the technology described herein comprises: checking whether the respective region or regions of the one or more input surfaces that will contribute to the output surface region has/have changed; and if the respective contributing region or regions of the one or more input surfaces has/have not changed (and may be subject to any other required criteria being met): reading the previous version of the at least one region of the output surface from the buffer and sending it for use. Thus, where there is already a previous version for the at least one region of the output surface stored in the buffer and it is determined that the respective contributing region or regions of the one or more input surfaces have not changed (and any other required criteria are met), then the at least one region of the output surface does not need to be regenerated and can simply be read from the buffer.

On the other hand, if a previous version for the at least one region of the output surface is stored in the buffer and if the respective region or regions of the contributing one or more input surfaces are determined to have changed, then an embodiment of the technology described herein comprises: reading in the respective contributing region or regions of the one or more input surfaces and generating the at least one region of the output surface from the respective contributing region or regions of the one or more input surfaces; and sending the at least one region of the output surface for use without storing it in the buffer for future use. Thus, where there is already a previous version for at least one region of the output surface stored in the buffer but it is determined that the respective contributing region or regions of the one or more input surfaces have changed, then the at least one region of the output surface is regenerated and sent for use without being written to the buffer.

When checking whether the respective region or regions of the one or more input surfaces that will contribute to the output surface region has/have changed, this may involve comparing the one or more input surfaces that will contribute to the new version of the output surface region with the one or more input surfaces that contributed to the stored version of an/the output surface region.

Where the input surface regions that contribute to an output surface region are to be considered, then the regions of the input surface or surfaces that contribute to the region of the output surface in question can be determined as desired. In one embodiment this is done based on the process (e.g. algorithm) that is to be used to generate the region of the output surface from the region or regions of the input surface or surfaces. For example, the determination may be based on the compositing algorithm (process) that is being used. A compositing algorithm may specify how (e.g. size, position, orientation, ordering, layer priority and/or blending algorithm) an input window (surface) is displayed in the output frame (surface).

In another embodiment, a record is maintained of the input surface region or regions that contributed to (have been used to generate) each respective output surface region, and then that record is used to determine which region or regions of the input surface or surfaces contribute to the region of the output surface in question. The record may, for example, comprise data, such as metadata, representing which region or regions of the input surface or surfaces contribute to a region of the output surface. The data may specify a list of coordinates or other labels representing the region or regions, for example.

In this case, a record could be maintained, for example, of those input surface regions that contribute to the output surface region (and in an embodiment this is done), or the record could indicate the input surface regions that do not contribute to the output surface region.

In another embodiment, the input surface regions that contribute to an output surface region are determined based on the process that is being used to generate the output surface region (i.e. algorithmically), but a record is also maintained indicating if any of the so-determined surfaces do not in fact contribute to the output surface region (and so do not need to be checked for the purposes of the technology described herein (and then those indicated surfaces are not checked)). This may be more appropriate, for example, where the list of non-contributing input surface regions is relatively short compared to the list of contributing input surface regions.

In some embodiments, determining which region or regions of the input surface or surfaces contribute to the region of the output surface includes first determining which input surface or surfaces contribute to the region of the output surface, and then determining which region or regions of that input surface or those input surfaces contribute to the region of the output surface.

In some embodiments, determining which region or regions of the input surface or surfaces contribute to the region of the output surface includes first determining which version of the input surface or surfaces contribute to the region of the output surface.

The checking of whether the determined contributing region or regions of the input surface or surfaces have changed can be performed in any desired and suitable manner.

This may be done, as discussed above, by comparing some or all of the content of the respective versions of the input surface regions (e.g. of the current version of the region of the input surface (i.e. that will be used to generate the new version of the output surface region to be generated) and of the version of the region of the input surface that was used to generate the previous version of the output surface region) (to see if the input surface region has changed).

In some embodiments, as discussed above, a signature indicative or representative of, and/or that is derived from, the content of each input surface region is generated for each input surface region that is to be checked, and the checking process comprises comparing the signatures of the respective versions of the input surface regions in question (e.g. to determine whether the signature representing an input surface region has changed since the current version of the output surface region was generated).

Thus, in some embodiments, a signature, such as a CRC value, is generated for each input surface region, e.g. rendered tile, that is generated for the input surface or surfaces, and then stored appropriately, and associated with the region of the surface to which it relates. In some embodiments, the signatures are stored with the surfaces in the appropriate, e.g., window or frame, buffers. Signatures for the input surface regions contributing to an output surface region may be stored with the output surface region.

The signature generation, where used, may be implemented as desired. For example, it may be implemented in an integral part of the graphics processor that is generating (rendering) the input surfaces, or there may, e.g., be a separate "hardware element" that is intermediate the graphics processor and the buffer(s) where the input surfaces are stored.

In an embodiment, if the number of input surface regions that contribute to an output surface region exceeds a particular, e.g. selected, e.g. predetermined, threshold number, then rather than checking whether any of the input surface regions have changed, the output surface region is simply regenerated without performing any check as to whether any of the input surface regions have changed (and may be also without storing the regenerated output surface region in the buffer).

Similarly, in an embodiment, if the number of input surfaces that contribute to a given output surface region exceeds a particular, e.g. selected, e.g. predetermined threshold number, then again the output surface region may simply be regenerated without first checking whether any of the input surface regions have changed (and may also be without storing the regenerated output surface region in the buffer).

In these arrangements, the respective output surface regions for which the input surface regions will not be checked, may, e.g., be marked, e.g. in metadata, as not to be checked (and thus simply to be regenerated for the next version of the output surface). This may be achieved, e.g., by setting the data indicating whether the output surface region in question is stored in the buffer to indicate that the previous version of the output surface region is not stored in the buffer.

These arrangements allow the input surface checking process to be omitted in situations where, for example, that process may be relatively burdensome, for example because of the number of input surface regions that need to be checked.

In an embodiment, as well as or instead of comparing respective input and/or output surface regions to determine whether they have changed, it is also possible to perform the comparison for larger areas of an input surface and/or of the output surface, for example, for areas that encompass plural regions of the input and/or output surface, and/or for the input and/or output surface as a whole.

In this case, in an embodiment, content representing signatures are also generated and stored for the respective larger areas (e.g. for sets of plural input and/or output surface regions and/or for the entire input and/or output surface) of the input and/or output surfaces that could be considered.

In such an embodiment, when the number of regions from a given input surface that contribute to an output region exceeds a particular, e.g. selected, e.g. predetermined, threshold number of input surface regions, then instead of comparing each input region individually to determine if it has changed, a larger area of the input surface, e.g. the input surface as a whole, may be compared to determine if it has changed, and then a decision as to whether the individual surface regions have changed is made accordingly.

In an embodiment it is determined whether any input surface regions that should be used to generate to the output surface region will not be visible in the output surface region, and then only the input surface regions which will be visible in the output surface region are considered to be input surface regions that will contribute to the output surface region and so checked to see if they have changed. Input surface regions may not be visible in an output surface region because, for example, they are behind other opaque input surfaces that occlude them. In this case the regions of the input surface or surfaces that contribute to the region of the output surface in question could, e.g., be determined based on the process that is being used to generate the output surface region, but a record also maintained of those input surface regions that can't be seen (as they are obscured by higher priority opaque input surface regions).

In an embodiment, if any transformation that is applied to an input surface whose regions contribute to an output surface region changes, then the output surface region is regenerated. This straightforwardly allows for the fact that any change in the transformation being applied to an input surface region that contributes to an output surface region is likely to mean that the output surface region will change.

In one embodiment, this is implemented such that if any of the contributing input surfaces has/have been transformed since the output surface was last generated, the region (and may be all of the regions) of the output surface are regenerated. For example, if any of the one or more input surfaces have been resized, moved, rotated and/or brought forwards or backwards in a display hierarchy of multiple overlapping surfaces, then the region(s) of the output surface may be regenerated (and the whole output surface may be regenerated).

Similarly, if the front to back ordering of the contributing input surfaces changes, then the region(s) of the output surface may be regenerated (and the whole output surface may be regenerated).

Equally, in an embodiment, if the set of input surfaces that contribute to the output surface and/or if the set of input surfaces that contribute to the output surface region changes, then the region(s) of the output surface may be regenerated (and the whole output surface may be regenerated).

Similarly, if the set of input surface regions that contribute to the output surface region changes, then the output surface region may be regenerated.

Again, in these arrangements where the output surface or output surface region is regenerated, then in an embodiment the output surface or the output surface region is sent for use without also storing it in the buffer.

Where an output surface region is to be regenerated, then it should be re-generated (i.e. generated afresh) using the input surface regions in the appropriate manner for the output surface generation process (compositing process) that is being performed.

The generated output surface region (or the output surface region read from the buffer) is then sent for use, e.g. sent to a display for display. This can be implemented as desired. The display may be local to (part of the same device as) the compositing display controller (and other processors), but it could be a remote display to which the output surface is transmitted, e.g., via a physical connection or may be wirelessly. The display can be any suitable form of display, such as a screen, etc. . . . .

The compositing display controller and, e.g., other components may be on the same or different chips in a device.

Although the technology described herein has been described above with particular reference to the processing of a single region of the output surface, as will be appreciated by those skilled in the art, where the output surface is made up of plural regions, the technique of the technology described herein may be used for plural, e.g. for each, respective region of the output surface. Thus, in an embodiment, plural regions of, e.g. each region of, the output surface are processed in the manner of the technology described herein. In this way, the whole output surface will be generated by the process of the technology described herein.

It will also be appreciated that the technology described herein is particularly applicable to arrangements in which a succession of output surfaces, e.g. frames to be displayed, are generated from a succession of input surfaces (that may, e.g., remain the same, or vary over time). Thus an embodiment of the technology described herein comprises generating a succession of output surfaces, and when each new version of the output surface is to be generated, carrying out the operation in the manner of the technology described herein. Thus, in an embodiment the process of the technology described herein is repeated for plural versions of a given output surface that are being generated (and as they are generated), e.g. as each successive new version of the output surface is generated.

In some embodiments, the system is configured to always regenerate each output surface region periodically, e.g., once a second, and/or once every particular, e.g., selected, number of versions of the output surface (e.g. every certain number of output frames). This will then ensure that each output surface region is regenerated at least at a minimum, selected period of time. This may thereby avoid, e.g., erroneously matched output or input surface regions (e.g. because their signatures happen to match even though their content actually varies) causing an output surface region to not be regenerated for more than a given, e.g. desired or selected, period of time.

A saturating counter, for example, may be provided to count the number of frames that the region was unchanged for, and if this number exceeds a certain, e.g. selected, e.g. predefined value, such as 60 (e.g. with a 60 Hz output display rate), then the region of the output frame may be regenerated. Each output surface region may be regenerated at least once per second.

In this case, the output surface region(s) may be regenerated, e.g., by simply writing out an entire new output surface periodically (e.g. once a second). However, in some embodiments, new versions of output surface regions are written out to the output surface individually on a rolling basis, so that rather than writing out a complete new version of an output surface in one go, a selected portion of the output surface is written out anew each time a new version of the output surface is generated, in a cyclic pattern so that over time all of the output surface is eventually written out as new.

The output surface buffer may be an on-chip buffer or it may be an external buffer (and, indeed, may be more likely to be an external buffer (memory), as will be discussed below). Similarly, the output surface buffer may be dedicated memory for this purpose or it may be part of a memory that is used for other data as well. In some embodiments, the output surface buffer is a frame buffer for the graphics processing system that is generating the surfaces and/or for a display that the surfaces are to be displayed on. The output frame buffer could be provided on-chip, e.g. with the display controller. However, in some embodiments, the output frame buffer is provided in or as off-chip memory.

The input surface(s) can be stored in any suitable and desired manner in memory. They may be stored in appropriate buffers. Again, these buffers may be an on-chip buffer or buffers or may be an external buffer or buffers. Similarly, they may be dedicated memory for this purpose or may be part of a memory that is used for other data as well. The input surface buffers can be, e.g., in any format that an application requires, and may, e.g., be stored in system memory (e.g. in a unified memory architecture), or in graphics memory (e.g. in a non-unified memory architecture).

The compositing display controller may comprise any suitable processing circuitry. It may comprise a CPU and/or a GPU, for example.

The technology described herein also extends to the compositing display controller itself. Thus, another embodiment of the technology described herein comprises a compositing display controller for providing an output surface (e.g. to a display for display), the compositing display controller:

generating respective output surface regions that together form the output surface, each respective region of the output surface being generated from a respective region or regions of one or more input surfaces; and being configured to, when a new version of an output surface is to be provided, perform the following steps for at least one region of the output surface:

check whether a previously generated version for the at least one region of the output surface is stored in a buffer; and if a previously generated version for the at least one region of the output surface is not stored in the buffer:

read in the respective region or regions of the one or more input surfaces from which the at least one region of the output surface is to be generated, and generate a new version of the at least one region of the output surface from the respective region or regions of the one or more input surfaces;

determine whether the at least one region of the output surface is likely to change;

and if it is determined that the at least one region of the output surface is unlikely to change:

send the new version of the at least one region of the output surface for use and write the new version of the at least one region of the output surface to the buffer.

As will be appreciated by those skilled in the art, the compositing display controller of this embodiment of the technology described herein may also include any one or more or all of the features of the technology described herein, as appropriate.

In an embodiment, the system is a system for displaying windows, e.g. for a graphical user interface, on a display, and may be a compositing window system.

In some embodiments, the technology described herein is used in conjunction with another frame (or other output) buffer power and bandwidth reduction scheme or schemes, such as, and in some embodiments, output (e.g. frame) buffer compression (which may be lossy or loss-less, as desired).

As will be appreciated by those skilled in the art, in some embodiments at least, the technology described herein effectively decides whether to write the at least one region of the output surface to a buffer based on a determination of whether the at least one region of the output surface is likely to change (e.g. in the next frame). If the at least one region of the output surface is likely to change then the step of writing it to a buffer may be omitted.

Thus, a further embodiment of the technology described herein comprises a method of providing an output surface, the output surface comprising one or more regions that together form the output surface, each respective region of the output surface being generated from a respective region or regions of one or more input surfaces; the method comprising:

when a new version of an output surface is to be provided, for at least one region of the output surface:

checking whether a previously generated version for the at least one region of the output surface is stored in a buffer; and if a previously generated version for the at least one region of the output surface is not stored in the buffer:

reading in the respective region or regions of the one or more input surfaces from which the at least one region of the output surface is to be generated, and generating the at least one region of the output surface from the respective region or regions of the one or more input surfaces;

determining whether the at least one region of the output surface is likely to change; and deciding whether or not to write the at least one region of the output surface to the buffer based on the determination of whether the at least one region of the output surface is likely to change.

A further embodiment comprises a system for providing an output surface, the output surface comprising one or more regions that together form the output surface, each respective region of the output surface being generated from a respective region or regions of one or more input surfaces; the system comprising a buffer and a compositing display controller and wherein the compositing display controller is configured to, when a new version of an output surface is to be provided, perform the following steps for at least one region of the output surface:

check whether a previously generated version for the at least one region of the output surface is stored in a buffer; and if a previously generated version for the at least one region of the output surface is not stored in the buffer:

read in the respective region or regions of the one or more input surfaces from which the at least one region of the output surface is to be generated, and generate the at least one region of the output surface from the respective region or regions of the one or more input surfaces;

determine whether the at least one region of the output surface is likely to change; and decide whether or not to write the at least one region of the output surface to the buffer based on the determination of whether the at least one region of the output surface is likely to change.

For example, if it is determined that the at least one region of the output surface is unlikely to change, then the at least one region of the output surface may be written to the buffer.

On the other hand, if it is determined that the at least one region of the output surface is likely to change, then the at least one region of the output surface may not be written to the buffer.

Determining whether the at least one region of the output surface is likely to change may comprise determining how likely the at least one region of the output surface is to change.

In cases where a previously generated version for the at least one region of the output surface is stored in the buffer, then the process described above in relation to other embodiments of the technology described herein may be performed. For example, it may then be checked if the contributing input surface regions are the same for the current and stored version of the at least one region of the output surface and, if they are, to use the stored version of the at least one region of the output surface (e.g. send it for display).

These embodiments of the technology described herein may comprise any of the features of the above embodiments described above.

As will be appreciated by those skilled in the art, in some embodiments at least, the technology described herein effectively dynamically selects between directly composing an output surface region, and storing and reusing a previous version of the output surface region (i.e., in effect, a frame buffer composition-type arrangement), depending upon which composition process may be the more efficient.

Thus, another embodiment of the technology described herein comprises a method of providing an output surface, the output surface comprising one or more regions that together form the output surface, each respective region of the output surface being generated from a respective region or regions of one or more input surfaces; the method comprising:

when a new version of an output surface is to be provided, for at least one region of the output surface:

determining whether to reuse a previously stored version of the at least one region of the output surface or whether to generate the at least one region of the output surface from the respective region or regions of the one or more input surfaces; and either sending the previously stored version of the at least one region of the output surface for use or generating the at least one region of the output surface from the respective region or regions of the one or more input surfaces and sending the generated at least one region of the output surface for use, in accordance with the determination.

Another embodiment of the technology described herein comprises a compositing display controller for providing an output surface (e.g. to a display for display), the compositing display controller:

generating respective output surface regions that together form the output surface, each respective region of the output surface being generated from a respective region or regions of one or more input surfaces; and being configured to, when a new version of an output surface is to be provided, perform the following steps for at least one region of the output surface:

determine whether to reuse a previously stored version of the at least one region of the output surface or whether to generate the at least one region of the output surface from the respective region or regions of the one or more input surfaces; and either send the previously stored version of the at least one region of the output surface for use or generate the at least one region of the output surface from the respective region or regions of the one or more input surfaces and send the generated at least one region of the output surface for use, in accordance with the determination.

As will be appreciated by those skilled in the art, these embodiments of the technology described herein can include any one or more or all of the features of the technology described herein as appropriate. Thus, for example, the determination as to whether a stored version of the output surface region should be reused or whether the output surface region should be generated from the input surface regions may be based on an assessment of whether the output surface region could have changed or not. Also, where the at least one region of the output surface is generated, it may also be determined whether to store the generated at least one region of the output surface for (possible) future use.

The Applicants have further recognised that while in general it is desired to perform the display composition in the manner of the technology described herein, there may be circumstances, for example where the output surface is being updated frequently, where it may be more efficient simply to compose the output surface (the output frame) directly without also considering whether to store it in the buffer. Thus, in an embodiment of the technology described herein, the operation in the manner of the technology described herein can be selectively disabled, and in certain circumstances is disabled, with the output surface then being simply composed directly from the input surfaces.

This may be done when certain, e.g. selected, criteria or conditions are met, such as when it is determined that the output surface (the output frame) needs to be updated more frequently (above a particular, threshold, update rate, for example). The rate of updating of the output surface could, for example, be determined by monitoring the rate at which the output surface regions are changing and/or by counting how many output surface regions are changing from frame to frame, and when those values exceed a certain threshold, the operation in the manner of the technology described herein could be (temporarily) disabled (and then, e.g., reactivated when it is determined that the rate of change of the output surface falls below a particular threshold value).

The Applicants have further recognised that certain modifications to the above-described operation may be desirable where, for example, the output surface is a surface (e.g. a frame) for display and adaptive luminance and/or backlight scaling is being used for the display. In such arrangements the data values used for the frame to be displayed may, e.g., be varied from their as-generated values in order, e.g., to compensate for the image luminance that is lost when the display backlight is dimmed, and/or so as to increase the contrast of the image when the backlight is dimmed. Corresponding processes may be used, e.g., to enhance the displayed image for given (detected) ambient lighting conditions.

The Applicants have recognised that in the situations where the frame to be displayed is to be modified for the purposes, e.g., of backlight dimming compensation, then it can be the case that data positions within the frame that has been displayed will all be set (e.g. saturated) to the same, common, e.g. maximum, data value. The Applicants have further recognised that knowledge of the fact that data position values within the displayed frame will be set (e.g. saturated) to a common value can advantageously be used to modify the signature comparison process described above, so as to increase the likelihood that the modified surface regions when their signatures are compared will be determined to be the same. This can then increase the possibility of identifying surface regions that will in practice be caused to be the same where backlight compensation or another process that, e.g., causes data position values to be saturated, is being used.

The signature generation process can be modified to take account of this in any suitable and desired manner. In one embodiment, information regarding the display modification compensation that is being applied is used in the surface and/or signature generation process to identify data positions within a surface region that will be set (e.g. saturated) to a common value as a result of the display modification operation. Those data positions are then set to the same common value (e.g. the saturated, maximum value) before the signature for the surface region in question is generated. This will then allow the signature comparison process to take account of the fact that in the final output frame, the data positions in question will be set to a single common value.

In another such embodiment, the signature generation and comparison process is modified in the situation where a display modification operation that can cause output frame data position values to be set to the same common value is being used, by performing the signature evaluation using signatures based on only selected, least significant bits (LSB) of the data in each surface region.

In this case, the signatures that are compared for each version of a surface region will be generated using only selected, least significant bits (LSB), of the data in each surface region (e.g. R[5:0], G[5:0] and B[5:0] where the surface data is in the form RGB888). Thus, in an embodiment, the signatures that are compared are based on a selected set of the least significant bits of the data for the surface regions. If these "LSB" signatures are then used to determine whether there is a change between surface regions, the effect will be as if the signatures were generated with the surface data values for the data positions that will be saturated already set to their saturated values.

In this case, a separate "LSB" signature may be generated for each surface region for this process.

Alternatively or in addition, in a system where "full" signatures (e.g. CRC values) using all the data for a surface region are required (e.g. for other purposes), then in an embodiment both a single full signature and one or more separate smaller signatures (each may be representative of particular sets of bits from the frame region data) may be provided for each surface region.

For example, in the case of RGB 888 colours, as well as a "full" R[7:0], G[7:0], B[7:0] signature, one or more "smaller" separate signatures could also be provided (e.g. a first "MSB colour" signature based on the MSB colour data (e.g. R[7:4], G[7:4], B[7:4]), a second "mid-colour" signature (R[3:2], G[3:2], B[3:2]), and a third "LSB colour" signature (R[2:0], G[2:0], B[2:0]).

In this case, the separate MSB colour, mid-colour, and LSB colour signatures could be generated and then concatenated to form the "full signature" when that is required, or, if the signature generation process permits this, a single "full" colour signature could be generated which is then divided into respective, e.g., MSB colour, mid-colour and LSB colour signatures.

In this case, the mid-colour and LSB colour signatures, for example, could be used for the operation of the technology described herein when display modification is in operation, but the "full" colour signature could be used, for example, when display modification is not being used and for other purposes.

As discussed above this arrangement will facilitate identifying surface regions that will be the same after the display modification process, thereby saving more power and bandwidth. This may be particularly applicable when processing video for display.

Thus, in an embodiment, where the output surface is a frame to be displayed and some form of display modification processing is being used to generate the final output frame that is being provided to the display, the operation of determining whether the surface regions have changed, and the signature comparison process for determining whether the surface regions have changed, may be modified based on the display compensation operation that is being performed. The signature generation process may be modified, e.g. either by generating the signatures that are to be compared using only a selected number of the least significant bits of the surface region data values, or by setting the data values for data positions within the surface regions in question to a common value based on the display modification operation that is being performed before generating the signatures that are to be compared for the surface regions in question.

The display modification operation that is being performed in this regard can be any suitable and appropriate form of display modification that can affect the actual data values of the data positions that are provided to the display for display, such as adaptive luminance and backlight scaling, luminance compensation, brightness compensation, image compensation, contrast enhancement, histogram equalisation, histogram stretching, image enhancement, or modifications used for ambient light adjustments, etc. . . . .

The Applicants have further recognised that the technology described herein may be extended to cases in which the input surfaces are input frames on which display processing is to be performed when generating the output surface (e.g. output frame) for display. Display processing may include, for example, scaling an image with respect to the dimensions of the display, upscaling of a low resolution image to a higher resolution image or vice versa, applying a sharpening or smoothing algorithm to the image, performing image enhancement or composing the image with other data such as text or another image, etc. . . . . Again, if one or more regions of the input surface is/are determined to be unlikely to change for a period of time, the (processed) one or more regions of the output surface can be written to memory for later use.

In these embodiments, the one or more input surfaces will be, e.g., input frames on which display processing is to be performed to generate the output surface that is an output frame for display and when a new output surface (e.g. an output frame) is to be provided, e.g. for display, for at least one region of the output surface, it will be checked whether a previously generated version for the region of the output surface is stored in a buffer. If a previously generated version for the region of the output surface is not stored in the buffer, the respective region or regions of the one or more input surfaces from which the region of the output surface is to be generated will be read in, and a new version of the region of the output surface generated from the respective region or regions of the one or more input surface, e.g. by performing the desired display processing on the respective region or regions of the one or more input surfaces. The new version of the region of the output surface will then be sent for use, e.g. to a display device for display.

It will also be determined whether the region of the output surface is likely to change. If it is determined that the at least one region of the output surface is unlikely to change, the new version of the region of the output surface is written to the buffer so as to be available for future use.

These arrangements can use any one or more or all of the features of the technology otherwise described herein. Thus, for example, the determination of whether the at least one region of the output surface is likely to change may be performed in one of the manners described above.

In an embodiment, whether the new version of the region of the output surface is written to the buffer for future use is dependent on one or more other factors or criteria, such as the type and/or the complexity of the processing to be performed on the respective region or regions of the one or more input surfaces to generate the output surface region, and/or (relative) properties of the input and output surface regions, such as, their (relative) sizes.

For example the Applicants have recognised that in some circumstances the output surface region may be smaller than (contain less data than) the input surface region or regions from which it is derived. This may be the case where, for example, the input surface region or regions is downscaled to generate the output surface region. In these circumstances it may be advantageous to store the output surface region for future use, even if the output surface region is only expected to remain unchanged for a short period of time, in view of the potential bandwidth and processing saving that the possibility of reusing the "smaller" output frame region can provide.

On the other hand, if the output surface region is larger (contains more data than the input surface region or regions from which it is derived (this may, e.g., be the case where the input surface regions are upscaled to provide the output surface region)) then it may be undesirable to write the new version of the region of the output surface to the buffer, irrespective of whether the region of the output surface is likely or unlikely to change, since fetching the stored data of the region of the output surface may be likely to consume more power and bandwidth compared to fetching and processing the respective region or regions of the one or more input surfaces.

Thus, in an embodiment, the determination of whether to write the new version of the region of the output surface to the buffer is dependent upon the relative sizes (in terms of the data that they contain) of the output surface region and of the input surface region or regions from which the output surface region is derived. Thus, in some embodiments, it is determined whether the respective region or regions of the one or more input surfaces has/have been scaled to generate the at least one region of the output surface, and/or whether the output surface region is compressed relative to (or has a higher compression ratio than) the input surface region or regions.

In such an embodiment, if the region of the output surface contains less data than the respective region or regions of the one or more input surfaces (e.g., if the respective region or regions of the one or more input surfaces has/have been downscaled to generate the output surface region, and/or if the output surface region is compressed relative to (or has a higher compression ratio than) the input surface region or regions), the new version of the region of the output surface may be written to the buffer as well as being sent for use, e.g. for display on a display device. The arrangement may be such that the period over which the output surface is expected to be unchanging for it to be determined that the output surface region is unlikely to change (such that the output surface region will be stored in the buffer) is reduced.

On the other hand, if it is determined that the region of the output surface contains less data than the respective region or regions of the one or more input surfaces, e.g. the respective region or regions of the one or more input surfaces has/have been scaled up to generate the region of the output surface and/or are more compressed than the output surface region, the new version of the region of the output surface is sent for use without writing it to the buffer. The output surface region storage may simply be disabled if it is determined that the output surface region is larger than (contains more data than) the input surface region or regions.

In an embodiment, the power and bandwidth overhead for processing the input frame region or regions relative to the power and processing overhead of writing the output region to the buffer (and retrieving it therefrom) is also or instead used to influence whether to store the output surface in the buffer or not. This may be useful where, for example, the input surface region or regions are not scaled to generate the output surface region, as in that case it may still be desirable to consider the power consumption requirements of writing the output surface region to the buffer relative to regenerating it.

The writing or not of the output surface region to the buffer in these arrangements could be achieved as desired. For example, the system could be set such that if it is determined that the output surface region contains (requires) more data than the input surface region or regions, the writing of the output surface to the buffer is simply disabled. Correspondingly, if it is determined that the output surface region will contain (require) less data than the respective input surface region or regions, then the system could be configured to always write the output surface region to the buffer.

In an embodiment, the relative data size of the output surface region and the input surface region or regions is used to adjust the criteria (e.g. the threshold) for determining that the output surface region is unlikely to change. Thus, for example, where it is determined that the output surface region contains less data than the input surface region or regions from which it is derived, the threshold for determining that the output surface region is unlikely to change may be reduced (i.e. such that the output surface region, e.g. needs to be expected to be unchanged for a shorter period of time and/or frames in order to trigger the storing of the output surface region in the buffer).

The Applicants have further recognised that some forms of input surface processing and output surface generation, such as when display processing is being performed, can comprise plural processing stages (i.e. plural processing stages in which each processing stage takes an input surface or surfaces and generates a respective output surface for that processing stage). In this case, there may be a sequence of plural processing stages between the initial input surfaces and the final output surface that is provided for use (e.g. for display).

The Applicants have further recognised that the arrangements of the technology described herein could usefully be applied to each such processing stage, e.g. if it is desirable and appropriate to do that. In this case therefore, it may be the case that intermediate versions of an overall output surface being processed will be saved in a buffer for future reuse. This would then allow, e.g., the processing for that intermediate stage to be omitted if a previously stored version of the surface region for that intermediate processing stage is already stored in the buffer.

Thus, in an embodiment, the operation in the manner of the technology described herein is applied to an intermediate processing stage of a sequence of surface (e.g. frame) processing stages. In this case, the output surface will accordingly be the output surface of the processing stage in question (rather than, e.g., being the final output surface that is to be provided to the display), and the input surface or surfaces will be the respective input surface or surfaces for the processing state in question (and thus again need not be the initial, "original" input surface or surfaces).

In this case therefore there may be plural processing stages that operate to generate the final output surface (e.g. output frame), and one or more of those processing stages (and in an embodiment plural of those processing stages) will have associated buffers and operate in the manner of the technology described herein to store regions of their respective output surfaces in their respective buffer (if it is determined to be appropriate to do that).

It would be possible to use the method of the technology described herein at one or at more than one of the multiple processing stages. This may depend, for example, on whether it could be advantageous to use the method of the technology described herein for the processing stage in question. For example, the operation in the manner of the technology described herein could be, and in an embodiment is, used for processing stages where it is known that the output surface of the processing stage is likely to contain less data than the input of the processing stage, but may not be used for those processing stages where it is known that the output of the processing stage will be likely to contain more data than the input surfaces for the processing stage. For example, it may be the case that an intermediate processing stage will produce an output that has good compression characteristics (e.g. before sharpening is applied), and so it may be advantageous to look to store the output of that processing stage in a buffer for future use, rather than (or as well as) the final output surface.

These arrangements can use any or all of the features of the technology described herein. Thus, for example, the determination of whether to store a region of an output surface of an intermediate processing stage (for example) may be dependent upon the relative sizes (amount of data) of the input and output surfaces and, e.g., whether any scaling or compression is being applied to the input surface to generate the output surface at the processing stage in question.

In cases where an output surface is compressed before being sent for use e.g. to a display device for display, the Applicants have recognised that it may be desirable to write the compressed output surface to a buffer for reuse if the output surface is unlikely to change. If the corresponding region or regions of one or more of the plural input surfaces that form(s) an output surface region is/are unlikely to change for one or more cycles, instead of or in addition to writing the output surface region to the buffer, the compressed version of the output surface region may be written, such that bandwidth and memory usage may be reduced, and the compressed output surface region may be reused (e.g. sent to the display) directly, whereby the amount of processing required to compress the output surface region may be reduced.

Thus, in an embodiment, the new and/or previously generated (or both) versions of the at least one region of the output surface are compressed versions of the region of the output surface. Correspondingly, in an embodiment, alternative or in addition to writing a region or regions of an output surface to memory, a compressed version of the output surface region or regions is stored for (potential) re-use. By writing a compressed version of the output surface regions, it is possible to reduce bandwidth and memory usage, and by fetching from memory and reusing the already compressed version, it is possible to reduce the amount of processing required to compress output surface regions.

The determination of whether to store (and then re-used) a compressed version of a region of an output surface can be performed using any or all of the features of the technology described herein. For example, each region may be a tile that the processing operation operates on, and the determination of whether a region is likely to change may be carried out in one of the manners discussed above, e.g. by comparing signatures representative of the content of the regions in question.

Where a line-based compression algorithm is used, e.g. which is applied along raster lines of an output surface, e.g. Display Stream Compression (DSC), the regions of an output surface that are considered may be lines (e.g. 32×1 sampling positions in size) and may correspond to a raster line or a portion of a raster line, and signatures for the line (or line portion) may be used for the purpose of comparing regions. In an embodiment where a, e.g. raster, line of an output surface to be compressed comprises at least a first portion and a second portion, when data of the line is sent to the display, if the first portion of the line is to be read before the second portion, if it is determined that only the first portion of the line has not changed while the second portion of the line is determined to have changed, the compressed first portion may be fetched from the buffer and sent directly to the display and only the changed second portion needs to be compressed before being sent.

In this arrangement, the "final", e.g. to be displayed, version of the output surface is compressed, so any composition of the input surfaces to form the output surface may be done before the output surface region(s) are compressed (and, if appropriate, stored in the buffer).

In cases where an output surface is generated from plural input surfaces, different ones of the plural input surfaces may update at different frequencies. The determination of whether a region of the final output surface is likely to change may therefore result in many incidences when the region of the output surface is determined as likely to change, although the corresponding region or regions of one or more of the plural input surfaces is/are unlikely to change for a number of cycles. The Applicants have accordingly recognised that the arrangements of the technology described herein may also usefully be applied to subsets of an overall set of plural input surfaces in the case where an output surface is generated from plural input surfaces.

Thus, as an alternative or in addition to assessing whether an overall, "final" output surface region generated from respective regions of all the input surfaces that are to contribute to the overall, final output surface region is likely to change (which likelihood is determined by the input surface that changes most frequently), an intermediate output surface region generated from respective regions of a subset of the input surfaces that are to contribute to the overall, final output surface region may be assessed instead or as well to determine if it is likely to change. By considering the plural input surfaces that together generate the final output surface as one or more subsets, the probability of identifying unchanging regions of input surfaces is increased, and by writing one or more intermediate output surfaces for the final output surface to memory and reusing them when generating subsequent overall, final output surfaces, the number of read transactions and the amount of processing may be reduced.

Thus, in this case the output surface that is being formed will be an intermediate output surface that is being formed from a subset of the input surfaces that are to be used to form the overall, final output surface (of the, e.g., processing stage in question, and/or of the overall output surface generation process) (and if it is determined that an intermediate output surface region is unlikely to change, the intermediate output surface region will be written to the buffer), and the sending of the new version of the at least one region of the intermediate output surface for use will comprise sending that output surface region for compositing with one or more other input surface regions.

Correspondingly, in an embodiment, where an overall, final output surface is to be generated from respective regions of a set of plural input surfaces, the method of the technology described herein comprises (and the system of the technology described herein is configured to), when a new version of the overall, final output surface is to be provided, for at least one region of the output surface:

reading in the respective regions from which the output surface region is to be generated of a subset of the set of plural input surfaces that the output surface is to be generated from;

determining whether the respective regions of the subset of input surfaces are likely to change; and if it is determined that the respective regions of the subset of input surfaces are unlikely to change:

generating an intermediate output surface region from the respective regions of the input surfaces of the subset of input surfaces; and writing the intermediate output surface region to a buffer.

Similarly, another embodiment of the technology described herein comprises a method of providing an output surface, the output surface comprising one or more regions that together form the output surface, respective regions of the output surface being generated from respective regions of a set of plural input surfaces; the method comprising:

when a new version of an output surface is to be provided, for at least one region of the output surface:

reading in the respective regions from which the output surface region is to be generated of a subset of the set of plural input surfaces that the output surface is to be generated from;

determining whether the respective regions of the subset of input surfaces are likely to change; and if it is determined that the respective regions of the subset of input surfaces are unlikely to change:

generating an intermediate output surface region from the respective regions of the input surfaces of the subset of input surfaces; and writing the intermediate output surface region to a buffer.

Another embodiment of the technology described herein comprises a system for providing an output surface, the output surface comprising one or more regions that together form the output surface, respective regions of the output surface being generated from respective regions of a set of plural input surfaces; the system comprising:

a buffer; and a compositing display controller;

and wherein the compositing display controller is configured to, when a new version of an output surface is to be provided, perform the following steps for at least one region of the output surface:

read in the respective regions from which the output surface region is to be generated of a subset of the set of plural input surfaces that the output surface is to be generated from;

determine whether the respective regions of the subset of input surfaces are likely to change; and if it is determined that the respective regions of the subset of input surfaces are unlikely to change:

generate an intermediate output surface region from the respective regions of the input surfaces of the subset of input surfaces; and write the intermediate output surface region to a buffer.

As will be appreciated by those skilled in the art, these embodiments of the technology described herein can include, as appropriate, any one or more or all of the features described herein.

These embodiments of the technology described herein may further comprise, when a new version of the overall, final output surface is to be provided, for at least one region of the output surface:

checking whether a previously generated intermediate output surface region for the at least one region of the output surface is stored in the buffer; and if a previously generated intermediate output surface region is stored in the buffer:

determining whether the respective regions of the respective subset of plural input surfaces that the intermediate output surface region has been generated from have changed;

and if it is determined that the respective regions of the respective subset of plural input surfaces have not changed, reading the previously generated intermediate output surface region from the buffer, and generating the new version of the overall, final output surface region using the previously generated (and stored) intermediate output surface region.

The new version of the "final" output surface region may be generated from the read, previously generated and stored, intermediate output surface region and any remaining input surface regions from the input surfaces that are to contribute to the overall, final output surface region that were not part of the subset used to generate the intermediate output surface region. For example, an output surface may be composed of three input surfaces, and an intermediate output surface region may be generated from a subset comprising the first and second input surfaces, with the "final" output surface region then being generated by compositing the relevant region from the third input surface with the intermediate output surface region generated from the first and second input surfaces.

In this case, a new version of the intermediate output surface region need not be generated (the intermediate output surface region is not regenerated).

It may be the case, for example, that while an overall output surface region changes infrequently, respective regions of a subset of the plural input surfaces changes even less frequently than the remaining input surface regions with respect to the overall output surface region. Thus, in some embodiments, it may be desirable to store a previously generated version of an overall output surface region as well as one or more intermediate output surface regions of the overall output surface region. These embodiments may further comprise:

checking whether a previously generated version for the at least one region of the output surface is stored in a buffer; and if both a previously generated intermediate output surface region and a previously generated version for the at least one region of the output surface are stored in the buffer:

determining whether the respective regions of the plural input surfaces that the previously generated version for the at least one region of the output surface has been generated from have changed, if it is determined that the respective regions of the plural input surfaces that the previously generated version for the at least one region of the output surface has been generated from have not changed, using the previously generated version for the at least one region of the output surface as the new version of the output surface region. Then, any previously generated intermediate output surface regions stored in the buffer (even when the respective regions of the respective subset of plural input surfaces that the or each intermediate output surface region has been generated from have not changed) may not be used.

In this case, the previously generated version of the overall output surface region is selected and may be used as the new version of the output surface region whenever possible. Then, one or more previously generated intermediate output surface regions may be selected to generate the new version of the output surface region if no previously generated version of the overall output surface region is found, or the respective regions of the plural input surfaces that the previously generated version of the overall output surface region has been generated from are determined to have changed.

These processes may be repeated for each region (e.g. tile) that the overall, final output surface is divided into.

These embodiments of the technology described herein exploit the fact that where an output surface region is generated from respective regions of plural input surfaces, the probability of finding some of the plural input surfaces (a subset) that are unlikely to change is higher compared to finding all of the plural input surfaces unlikely to change, thereby increasing the probability of finding a surface region formed from compositing plural input surfaces that can be reused.

These embodiments apply where there are plural, e.g. three or more, input surfaces that will be used to form (that contribute to) a given, overall, output surface. There may be (and in an embodiment there is) more than one subset of plural input surfaces for which (from which) intermediate output surface regions may be generated. Each subset of input surfaces may comprise two or more, but not all, of the plural input surfaces. Where more than one subset of the plural input surfaces can be considered, then each such subset may be processed in this manner.

The grouping of the input surfaces into one or more subsets may be done in any suitable and desired manner. For example plural input surfaces that are considered to be unlikely to change from one cycle (version of the overall output surface) to the next are grouped together to form a subset. In some embodiments, input surfaces determined to (be likely to) change at the same or similar frequencies (e.g. based on their respective content and/or update rates) are grouped in the same subset. This is however not essential. The grouping of input surfaces into subsets for one (final) output surface need not be the same as the grouping of input surfaces into subsets for another (final) output surface. In an embodiment, each subset contains only input surfaces that are adjacent in the composition hierarchy (depth (Z) order).

In an embodiment, metadata is generated and stored for the intermediate output surface regions that are generated from a subset of the input surfaces. This metadata may indicate whether a stored intermediate output surface region is valid for use (or not), and/or indicates which of the input surfaces has been used for the intermediate output region(s) in question (are in the subset of input surfaces in question). The metadata may be per-region, or may be common to plural regions, as desired.

In an embodiment, metadata is set to indicate that an intermediate output surface region is valid when it is determined that the respective regions of the subset of the plural input surfaces that contribute to a stored intermediate output surface region have not changed, and metadata is set to indicate that an intermediate output surface region is invalid when it is determined that the respective regions of the subset of the plural input surfaces that contribute to a stored intermediate output surface region have changed.

In an embodiment, the arrangement in which an intermediate output surface region generated from respective regions of a subset of plural input surfaces that are to be used to generate the overall, final, output surface is considered and written to a buffer, is performed in addition to performing the corresponding operation in respect of the overall, final version of the output surface (region) that is generated from (respective regions of) all of the plural input surfaces. This may be useful in cases where, for example, one of the plural input surfaces changes more frequently than the remaining plural input surfaces. In this case, an intermediate output surface region may be reused for cycles in which the region of the one input surface has changed but the regions of the subset of the remaining plural input surface have not, while the full version of the output surface region may be reused for cycles in which none of the plural input surface regions has changed.

These arrangements can again use any or all of the features of the technology described herein. Thus, for example, each region may be a tile that the processing operation operates on, and the determination of whether a region is likely to change may be carried out in one of the manners discussed above, etc. . . . .

The technology described herein can be implemented in any suitable system, such as a suitably configured microprocessor based system. In some embodiments, the technology described herein is implemented in computer and/or micro-processor based system.

The various functions of the technology described herein can be carried out in any desired and suitable manner. For example, the functions of the technology described herein can be implemented in hardware or software, as desired. Thus, for example, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements (processing circuitry) and/or programmable hardware elements (processing circuitry) that can be programmed to operate in the desired manner. Similarly, the display that the windows are to be displayed on can be any suitable such display, such as a display screen of an electronic device, a monitor for a computer, etc. . . . .

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

The technology described herein is applicable to any suitable form or configuration of graphics processing system, renderer, and compositing display controller, such as processors having a "pipelined" rendering arrangement (in which case the renderer will be in the form of a rendering pipeline). It is particularly applicable to tile-based graphics processors, graphics processing systems, composition engines, compositing display controllers and video engines.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc. . . . .

The technology described herein also extends to a computer software carrier comprising such software which when used to operate a graphics processor, renderer, compositing display controller, or other system comprising a data processor causes in conjunction with said data processor said processor, renderer, controller, or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as a computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

Embodiments of the technology described herein in the form of compositing window systems, i.e. in which the contents of windows to be displayed on a display, e.g., for a graphical user interface, are first drawn into "off-screen" memory buffers (window buffers), and then combined (composited) for display, will now be described.

In this case, the input surfaces will be the input windows to be displayed, and the output surface will be the final, output, composited output window (frame). The composition process may use alpha-blending, transformations or other techniques, etc., rather than straight copies when compositing the input surfaces for display, as is known in the art.

Figure 2:
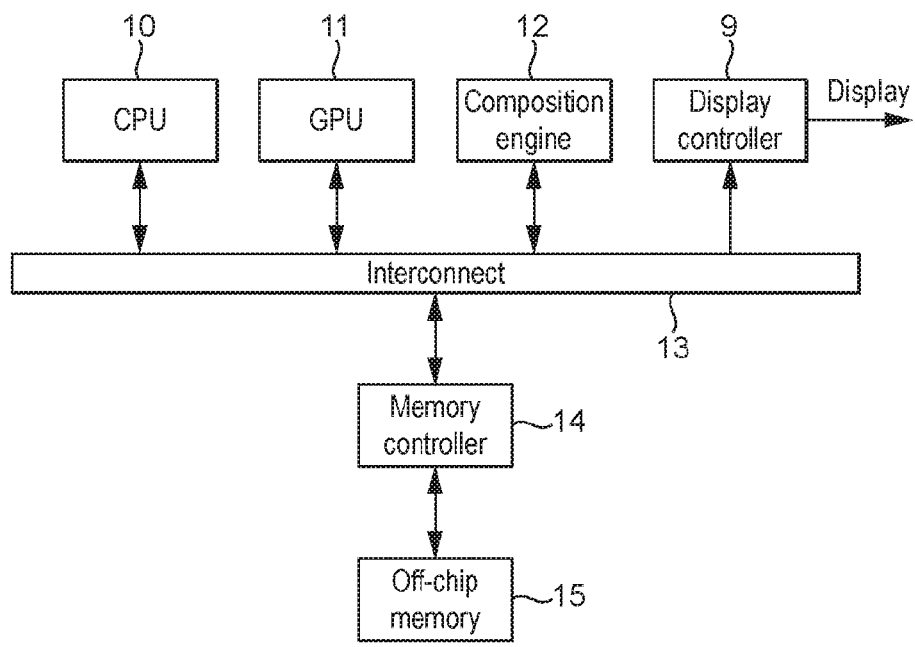
FIG. 2 is a schematic diagram illustrating a frame buffer composition system.
Figure 3:
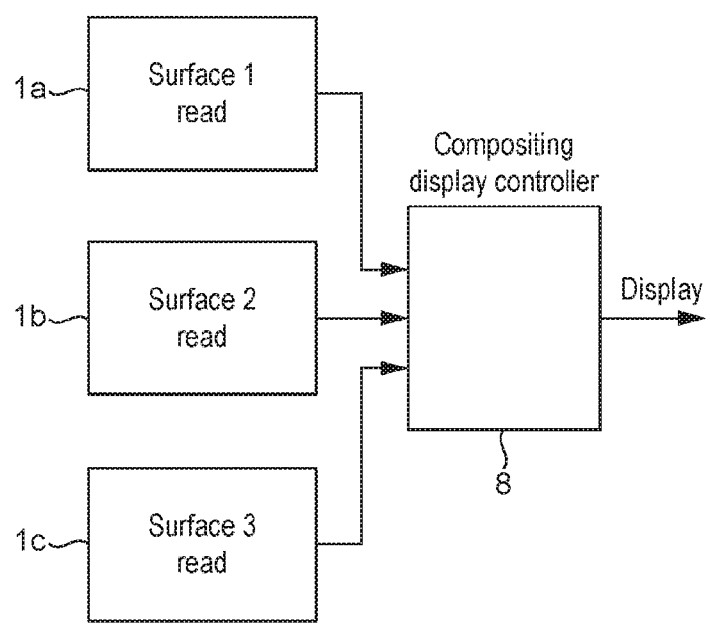
FIG. 3 is a diagram illustrating a direct composition process.
Figure 4:
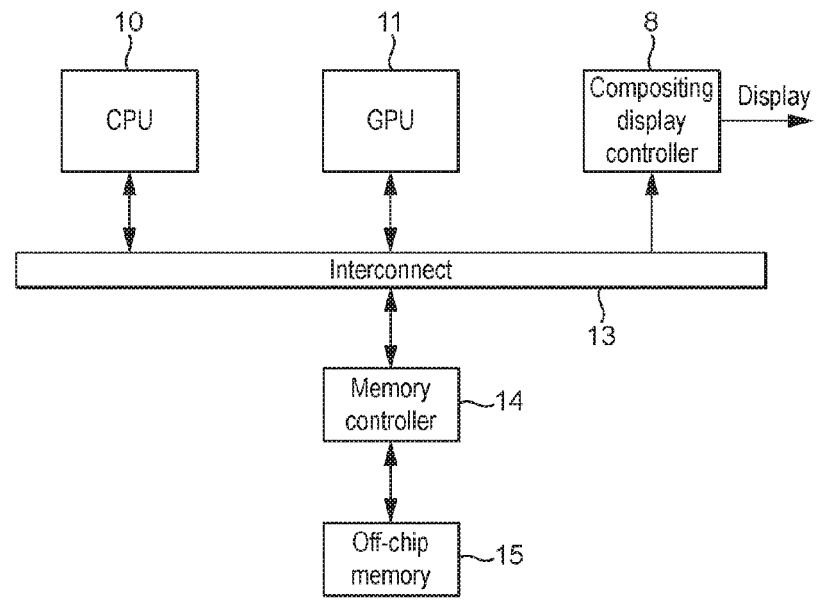
FIG. 4 is a schematic diagram illustrating a direct composition system.
Figure 5:
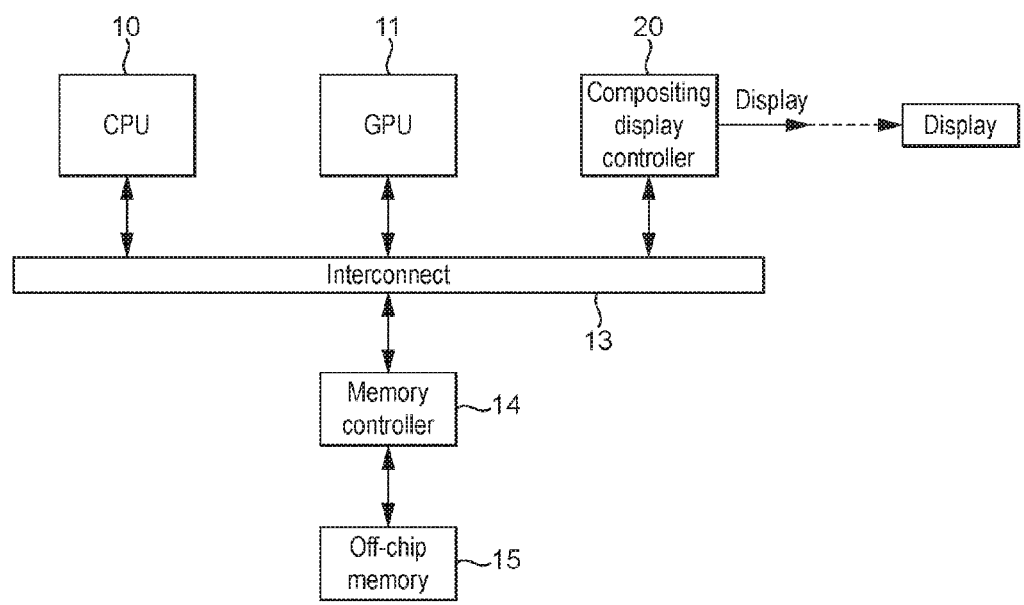
FIG. 5 is a schematic diagram illustrating a composition system according to an embodiment.

FIG. 5 is a schematic diagram illustrating a composition system according to an embodiment of the technology described herein. As in the direct and frame buffer composition systems shown in FIGS. 2 and 4 and described above, this system comprises a CPU 10, a GPU 11 and a memory controller 14, which communicate via an interconnect 13. The memory controller 14 also has access to an off-chip memory 15.

In addition, and in contrast with the systems mentioned above, the system of the present embodiment includes an "enhanced" compositing display controller 20 which is arranged to perform a compositing process according to an embodiment of the technology described herein, and send the composited output surface on to a display (not shown) for display.

Figure 6:
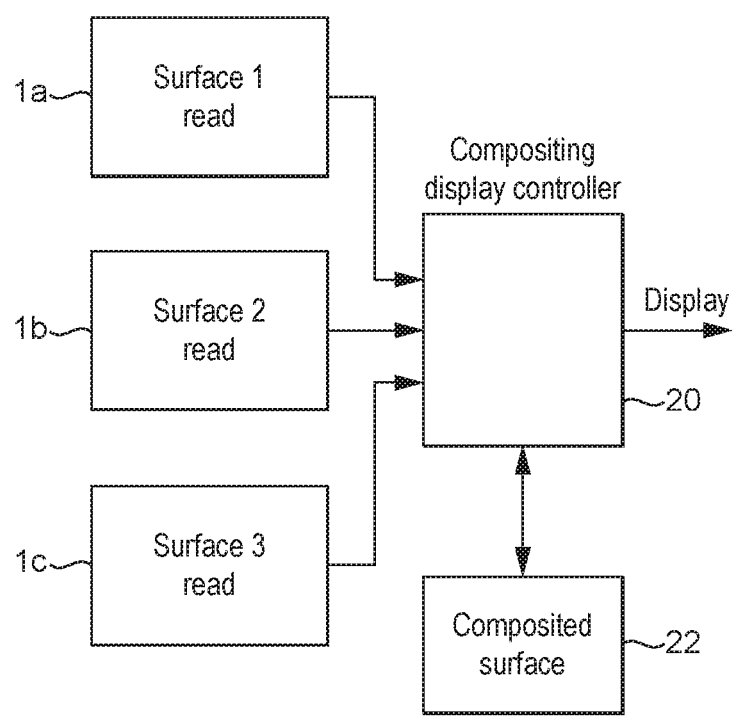
FIG. 6 is a diagram illustrating a composition process according to an embodiment.
Figure 7:
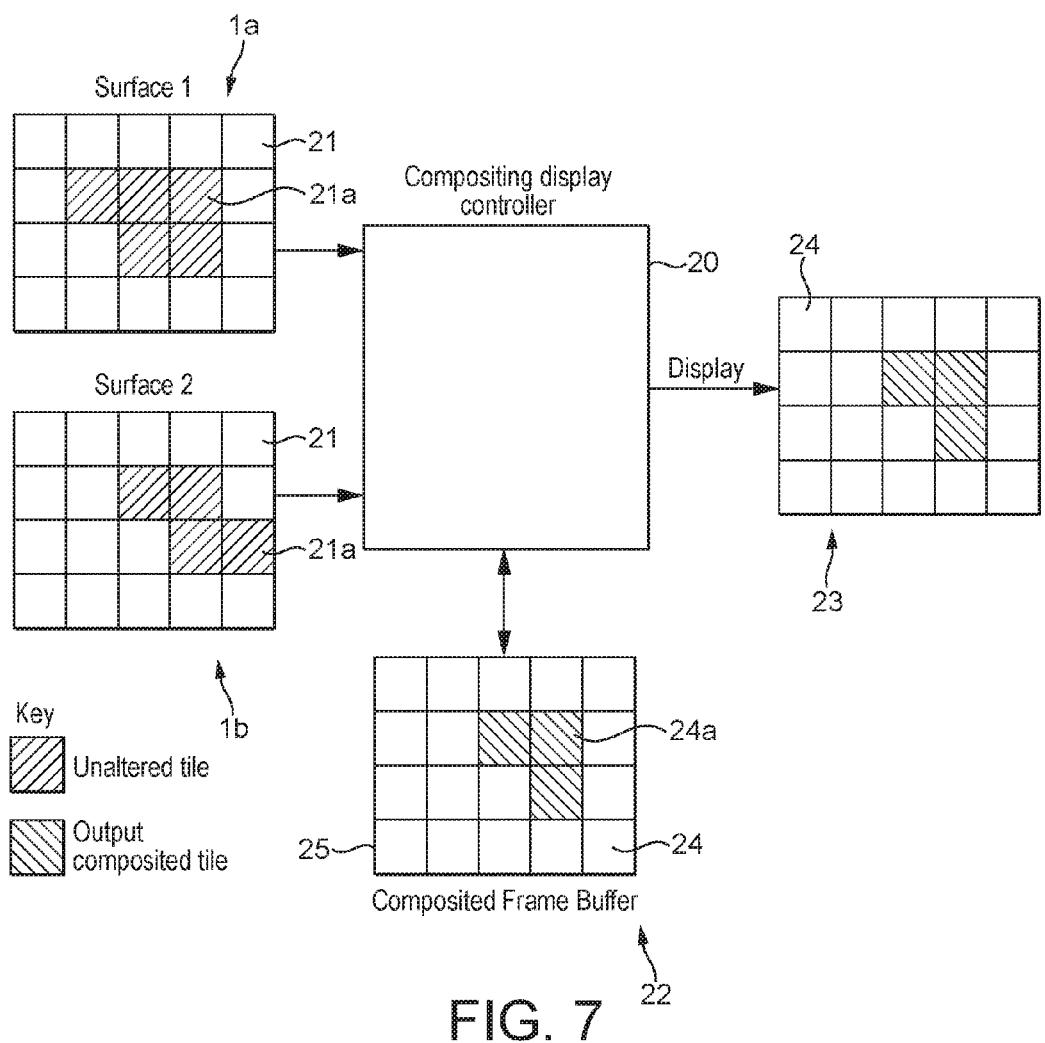
FIG. 7 is a schematic diagram illustrating the operation of embodiments.
Figure 8:
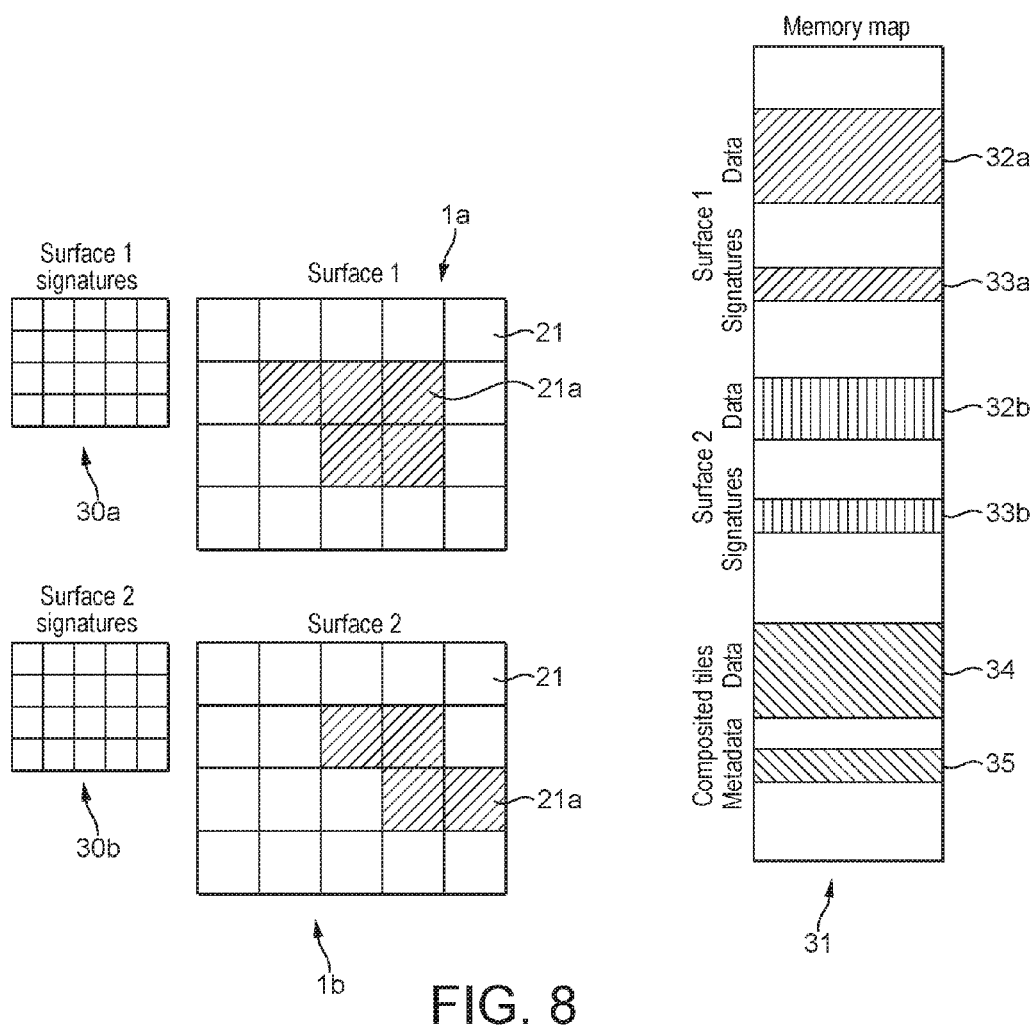
FIG. 8 is a schematic diagram illustrating the signatures and data stored for input surfaces and output tiles according to embodiments.
Figure 9:
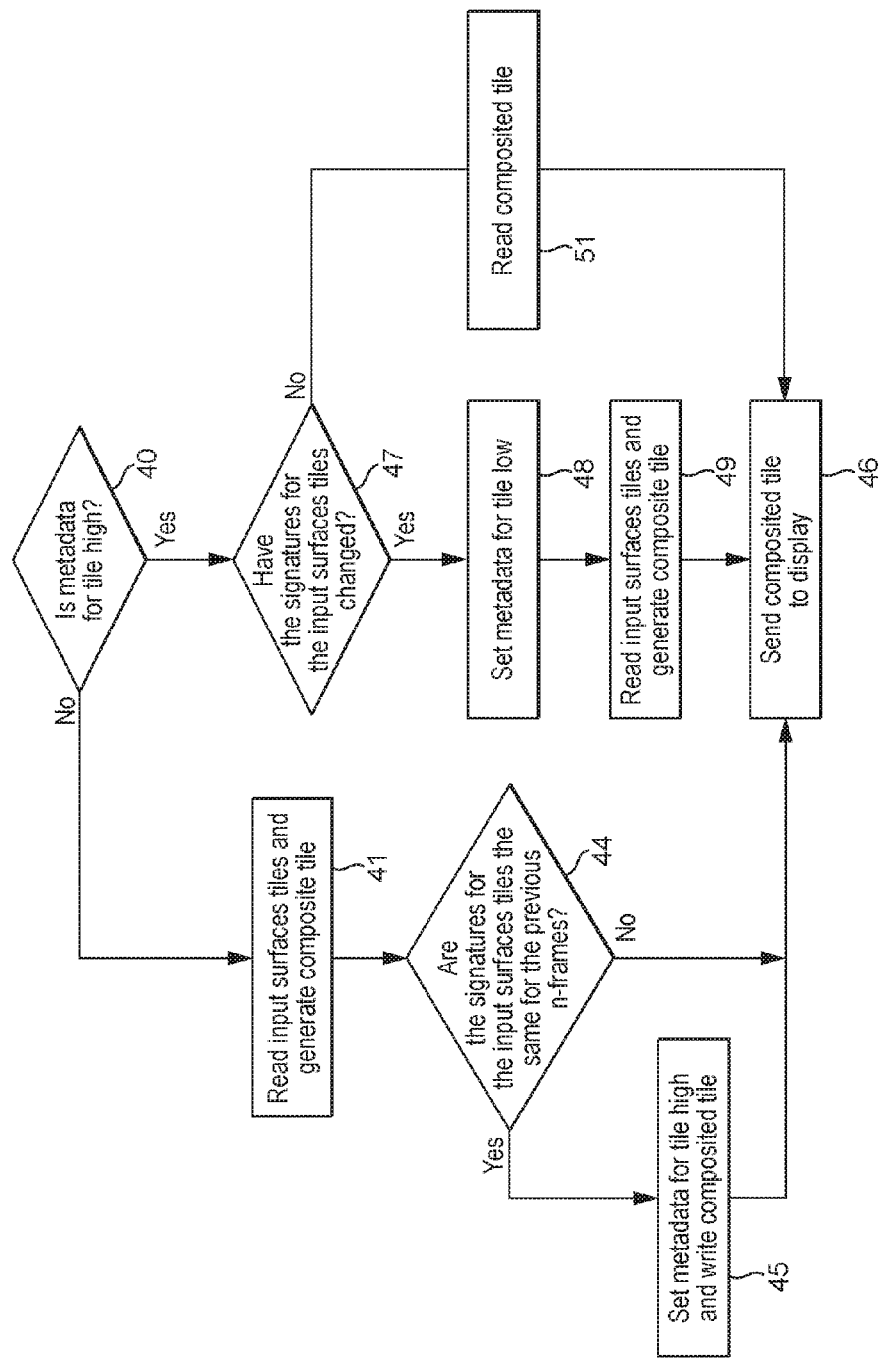
FIG. 9 is a flow diagram illustrating a method performed by a compositing display controller according to an embodiment.
Figure 10:
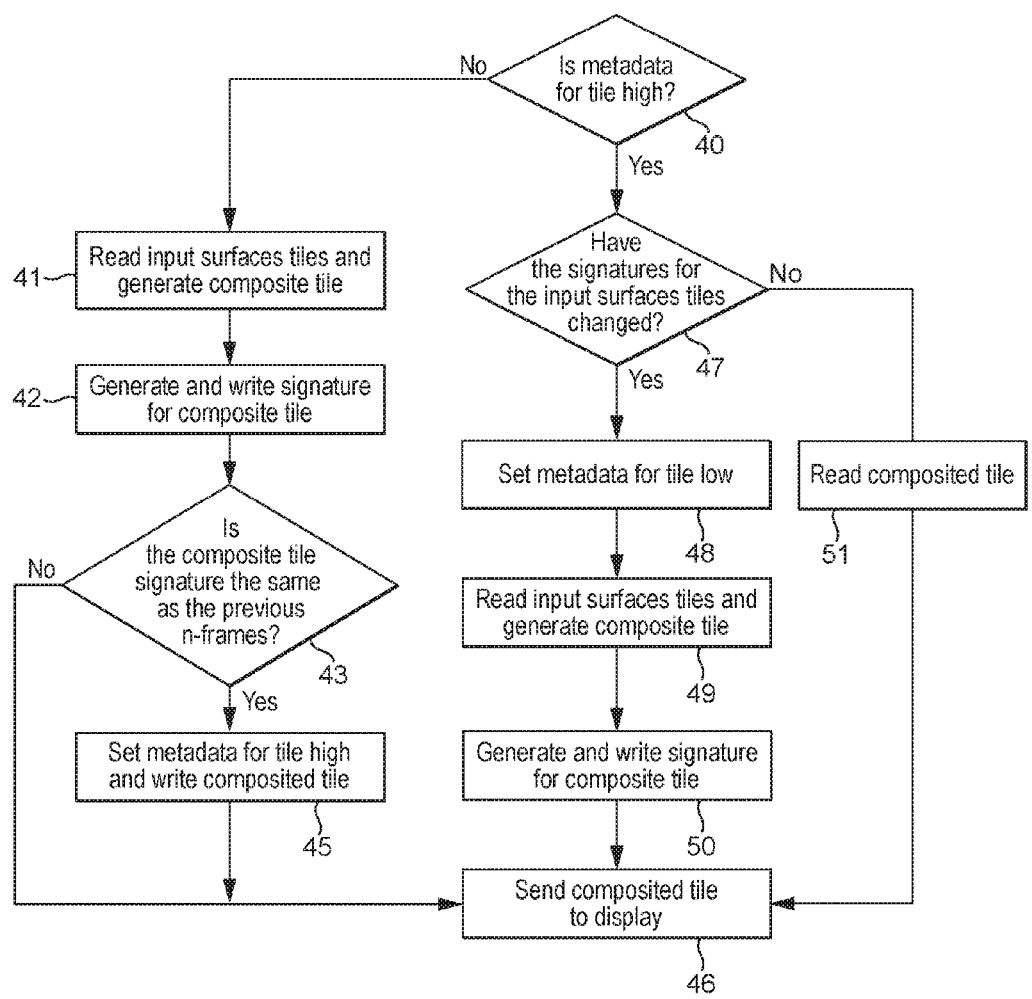
FIG. 10 is a flow diagram illustrating a method performed by a compositing display controller according to another embodiment.

FIGS. 6, 7 and 8 illustrate the basic operation of the compositing display controller 20 in the embodiments of the technology described herein. FIGS. 9 and 10 then show in more detail two embodiments of operation of the compositing display controller 20.

FIG. 6 shows an overview of the operation of the compositing display controller 20.

As shown in FIG. 6, input surfaces 1a-c are read in by the compositing display controller 20, which also has access to a stored composited output surface 22 stored in a buffer 25 in off-chip memory 15 (if a previously composited output surface has been stored in the buffer). Based on these input surfaces 1a-c and the stored composited output surface 22 in the buffer (if it has been stored), the compositing display controller 20 then performs a process according to an embodiment of the technology described herein and sends the composited output surface for display.

FIG. 7 shows schematically the use of two input surfaces 1a, 1b (which may, for example, be application windows generated for display in a compositing window system) being used to generate an output surface 23 (which may, e.g., be an output window (frame) for display to a user). The input surfaces 1a, 1b may, e.g., be generated (rendered) by a GPU and stored in buffers for use when compositing an output window for display.

As shown in FIG. 7, the respective input and output surfaces are each divided into a plurality of respective regions 21, 24. In the present embodiments the input surface regions 21 correspond to respective rendering tiles that a graphics processor that is rendering the respective input surfaces generates, and the output surface regions 24 correspond to respective tiles of the output surface 23 that the compositing display controller 20 produces. Other arrangements and configurations of surface regions could be used if desired.

As can be seen from FIG. 7, in this embodiment, there is assumed to be 1:1 mapping between the regions of the input surfaces 1a and 1b and the corresponding regions of the output surface 23 where those regions are to be displayed. Other arrangements would, of course, be possible.

In operation of the compositing display controller 20, when a new version of an output surface 23 is required (for example because the display needs to be refreshed), the new version of the output surface 23 is generated one region 24 at a time, with each output surface region 24 either being generated by the compositing display controller 20 from the respective input surface regions 21 that contribute to that output surface region, or being read from the buffer 25, and then being sent to the display for display. Also, when a new version of a region of the output surface 23 is generated by the compositing display controller 20 from its respective input surface regions, it is also determined whether to store the newly generated output surface region 24 in the buffer 25 that stores the output surface regions.

To facilitate this operation, a record in the form of metadata or one or more signatures is maintained indicating which output surface regions 24 have currently valid versions stored in the output surface buffer 25. This metadata or one or more signatures may, e.g., comprise a bitmap indicating which output surface regions have currently valid versions stored in the output surface buffer 25. The compositing display controller 20 then consults this metadata or one or more signatures when a new version of an output surface region is required, to determine whether there is a valid version of the output surface region stored in the output buffer 25 (that could accordingly then potentially be used for the new version of the output surface region) or not.

If, when a new version of an output surface region is required, the compositing display controller 20 determines that a valid previous version of the output surface region is not stored in the output surface buffer 25, then the compositing display controller 20 generates a new version of the output surface region 24 in question from the appropriate contributing input surface regions 21. It then sends the so-generated output surface region to the display for display.

The compositing display controller 20 also determines whether the newly generated output surface region 24 should be stored in the buffer 25 that stores the output surface regions.

To do this, the compositing display controller 20 determines whether the output surface region 24 in question is likely to change in the near future or not. This is done by considering signatures representative of the content of the output surface region and/or representative of the content of its contributing input surface regions. This process will be discussed in more detail below.

If it is determined that the output surface region 20 is not likely to change in the near future, then as well as sending the generated output surface region to the display for display, it is also written to (stored in) the output surface buffer 25. However, if it is determined that the output surface region is likely to change in the near future, then the output surface region is simply sent for display, without also storing it in the output frame buffer 25.

Data indicating which input surfaces and input surface regions were used to generate the output surface region may also be stored, if desired.

If, on the other hand, it is determined that there is a potentially valid version of the output surface region already stored in the output surface buffer 25, then it is considered whether that stored version of the output surface region can be reused for the new version of the output surface or not. To do this, the compositing display controller 20 determines whether the input surface regions that contribute to the output surface region have or could have changed since the version of the output surface region that is stored in the output surface buffer 25 was generated. This process again uses signatures representative of the content of the current versions of the input surface regions and of previous versions of the input surface regions.

If it is determined that the output surface region is unlikely to have changed since the version of the output surface region that is stored in the output surface buffer 25 was generated, then the compositing display controller 20 reads the stored version of the output surface region from the output surface buffer 25 and sends it to the display for display. On the other hand, if it is determined that the output surface region is likely to have changed from the version of the output surface region that is stored in the output surface buffer 25, then the compositing display controller 20 generates a new version of the output surface region from the respective contributing input surface regions and sends that generated output surface region for display, without storing it in the output surface buffer 25.

FIG. 7 shows an example of this operation. It is assumed that some input surface tiles 21a (the shaded tiles) are unchanged since the previous version of the input surfaces 1a and 1b, but that other input surface tiles (the unshaded tiles) have changed. Correspondingly, it is assumed that in the output frame 23, only the tiles 24a which are generated from tiles which are unchanged in both input surfaces 1a and 1b, are also unchanged in the output surface 23. These unchanged output tiles 24a are indicated with shading.

As shown in FIG. 7, only the unchanged output tiles 24a are stored in the output frame buffer 25 for (potential) future use. The remaining (unshaded) output tiles, which have changed since the previous frame, are not stored in the output frame buffer 25.

As discussed above, various forms of metadata and surface region content-indicating signatures, as well as the data representing the surface regions themselves, are stored and used in the present embodiments. This data may all be stored, for example, in the off-chip memory 15. Other arrangements would, of course, be possible, if desired.

FIG. 8 illustrates some of this data and how it may be stored in memory according to an embodiment of the technology described herein.

As shown in FIG. 8, and as discussed above, each input surface 1a, 1b has associated with it a set of signatures, 30a and 30b, that represents the content of the respective input surface regions (tiles) 21. Data 32a, 32b representing each respective tile (region) 21 of the input surfaces 1a, 1b is stored in memory 31, together with sets of signatures, 33a and 33b that represent the content of the respective input surface regions (tiles).

Correspondingly, a set of data 34 representing the tiles 24 of the composited output surface 23 that are stored in the output surface buffer 25 are stored, together with a corresponding set of metadata 35 which indicates for which composited output tiles a "valid" version of the output tile is stored in the output frame buffer 25. In addition to this metadata, a set of content representing signatures, one for each output surface tile (whether stored in the buffer 25 or not), is also stored to facilitate determining whether the output surface regions have changed or not. Also, if desired, and as will be discussed further below, metadata indicating which regions of which input surfaces were used to generate the current version of each respective output surface region may be stored.

Alternatively, the set of metadata 35 comprises signature values corresponding to each composited output tile. If the signature value for an output tile is a particular (not otherwise used) value such as "0" or "−999" then this indicates that a valid version of the output tile is not stored. All other signature values would indicate that a valid version of the output tile is stored.

FIGS. 9 and 10 show in more detail embodiments of the operation of the compositing display controller 20 when compositing output frames for display. FIGS. 9 and 10 both show the process at the stage when a respective output surface region is required for display.

In the embodiment shown in FIG. 9, at step 40, the compositing display controller 20 first determines whether the metadata or signature for the tile of the output surface being processed is high (i.e. whether or not a previous version of the composited output tile is stored in the output frame buffer 25).

If the metadata for the tile being processed is not high (i.e. there is not a "valid" version of the output surface tile stored in the buffer 25), the compositing display controller 20 reads in the input surface tile(s) that will contribute to that output surface tile and generates a composited output tile at step 41. The compositing display controller 20 then determines whether content-indicating signatures for those input surface tile(s) are the same for the previous n frames (where n is an integer in a range from 1-60) at step 44. This effectively gives a measure of whether the input surface tiles making up the output surface tile have changed recently or not (and thus of whether the output surface tile has changed recently or not).

If the input surface tile signatures for all the input surface tiles are the same for the previous n frames, that is taken to indicate that the output surface tile is unlikely to change in the next frame (since it has not changed for the last n frames), and so, at step 45, the composited output tile is written to the buffer 25 and the metadata for the output surface tile is set to high (to indicate that a "valid" composited output tile has been written to the buffer 25). The composited output tile is then sent to the display at step 46.

On the other hand, if the input surface tile signatures for any one of the contributing input surface tiles are found not to be the same for the previous n frames, that is taken to indicate that the output surface tile is more likely to change in the next frame (since it has changed at some point during the last n frames), and so the composited output tile is sent to display at step 46 without it also being written to the output surface buffer 25.

In cases where metadata for the output surface tile being processed is already high (i.e. a "valid" previous version of a composited output tile is stored in the buffer), the compositing display controller 20 determines, at step 47, whether the signatures of the input surface tiles that will contribute to the output surface tile have changed since the previous versions of the tiles.

If the signatures of the input surface tiles have changed (i.e. indicating that the input surface tiles have changed since the stored version of the output surface tile was generated), the metadata for the output surface tile is set to low, at step 48, to indicate that a "valid" previous version of the composited output tile is not stored in the buffer 25. Then at step 49, the compositing display controller 20 reads in the input surface tiles and generates a composited output tile, and then, at step 46, sends this composited tile to display.

On the other hand, if the signatures of the input surface tiles are determined not to have changed at step 47, then, at step 51, the composited output tile is simply read from the buffer 25 and, at step 46, sent to the display.

Thus, in cases where there is no composited output tile already stored in buffer 25, the compositing display controller 20 determines whether or not an output tile is likely to change (based on whether it has changed recently) and, if it is unlikely to change, stores it in the buffer 25 before sending the composited output tile to the display. On the other hand, if the output tile is likely to change, the output tile is simply sent to display without being stored in the buffer 25.

On the other hand, in cases where there is a composited output tile already stored in the buffer 25, the compositing display controller 20 then determines whether or not the input tiles have changed. If the input tiles have not changed, then the output tile stored in the buffer 25 is sent to the display (is reused). If the input tiles have changed, then a new composite output tile is generated and sent to the display (without being stored in the buffer 25).

FIG. 10 illustrates an alternative embodiment of the process performed by the compositing display controller 20. This is similar to the process of FIG. 9 except that step 44 is replaced with steps 42 and 43, and an additional step 50 is added between steps 49 and 46.

In the embodiment of FIG. 9, at step 44 (which is performed in cases where a "valid" previous version of the composited output tile is not stored in the buffer 25), the compositing display controller 20 determined whether content-indicating signatures for the input surface tiles are the same for the previous n frames. In contrast with this, in the embodiment of FIG. 10, at step 42 a content-indicating signature is generated for the composited output tile and written to memory, and, at step 43, the compositing display controller 20 determines whether the composited output tile's signature (not the signatures for the input surface tiles) is the same for the previous n frames. The result is effectively the same (i.e. an indication of whether the output surface tile has changed recently or not) but, in cases where there is more than one or indeed many input tiles, this process results in fewer signatures needing to be compared although it does include the additional step of generating and writing the signature for the composited output tile.

The additional step 50, which is performed between steps 49 and 46 (i.e. in cases where the previously displayed version of the composited output tile is stored in the buffer 25 but the signatures of the input surface tiles have changed), is the same as step 42, i.e. a content-indicating signature is generated for the composited output tile and written to memory. This means that, in this embodiment, whenever an output tile is generated, its signature is also generated and written to a memory so that, if required, it can be checked/compared at step 43.

Thus, the process shown in FIG. 10 is similar to that of FIG. 9 but, at some steps, rather than signatures of input tiles being compared against previous versions, it is the signature of the composite output tile which is compared against previous versions.

Figure 11:
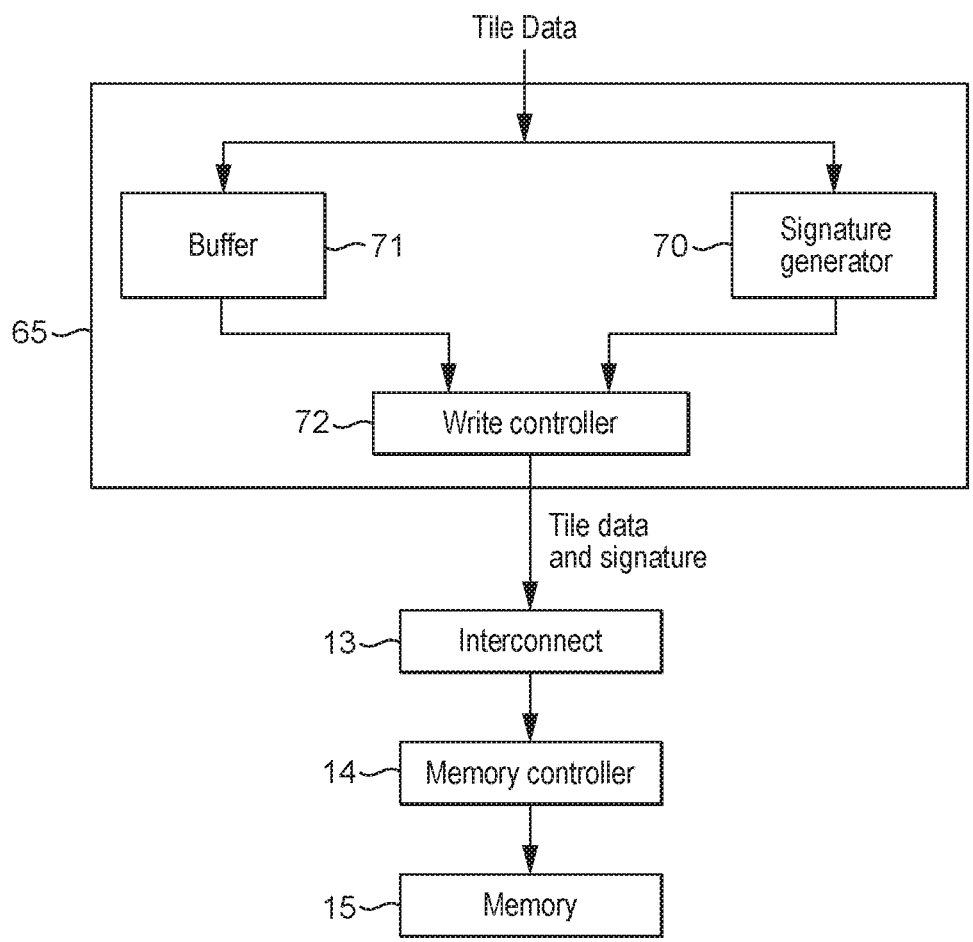
FIG. 11 is a schematic diagram showing an exemplary signature generation process that may be used in the embodiments.

As discussed above, the embodiments of the technology described herein use signatures representative of the content of the respective input (or input and output) surface tiles (regions) to determine whether those tiles have changed or not. FIG. 11 shows schematically an exemplary arrangement for generating the surface tile content-indicating signatures. Other arrangements would, of course, be possible.

In the present embodiments, this process uses a signature generation hardware unit 65. The signature generation unit 65 operates to generate for each tile a signature representative of the content of the tile.

As shown in FIG. 11, tile data is received by the signature generation unit 65 e.g. from the graphics processor (in the case of input surface regions) or from the compositing display controller 20 (in the case of output surface regions), and is passed both to a buffer 71 which temporarily stores the tile data while the signature generation process takes place, and a signature generator 70.

The signature generator 70 operates to generate the necessary signature for the tile. In the present embodiment the signature is in the form of a 32-bit CRC for the tile.

Other signature generation functions and other forms of signature such as hash functions, etc., could also or instead be used, if desired. It would also, for example, be possible to generate a single signature for an RGBA tile, or a separate signature for each colour plane. Similarly, colour conversion could be performed and a separate signature generated for each of Y, U and V. In order to reduce power consumption, the tile data processed by the signature generator 70 could be reordered (e.g. using the Hilbert curve), if desired.

Once the signature for a new tile has been generated, it is stored, as discussed above, in a per-tile signature buffer that is associated with the version of the surface in question in the memory 15, under the control of a write controller 14. The corresponding tile data is also stored in the appropriate buffer in the memory 15, and/or sent to the display for display.

As discussed above, the present embodiments can include determining whether signatures representing the content of the input surface regions that contribute to an output surface region have changed in the previous n output frames.

To do this, it is first determined which input surface regions contribute to the output surface region (tile) in question.

The determination of which input surface regions contribute to a given output surface region is based, e.g., on the process (e.g. algorithm) that is being used to generate the output surface region from the input surfaces (as the, e.g., window compositing process will typically specify which input surface regions should be used to generate a given output surface region (and how)).

Alternatively, a record (e.g. metadata) could be maintained of the input surface regions that contributed to each respective output surface region.

In the present embodiments, only visible input surface regions (for an output surface region) are considered as contributing to an output surface region and compared (as some input surfaces may be "displayed" behind other input surfaces which are opaque).

Once the input surface regions that will contribute to a given output surface region have been determined, it is then determined whether any of those input surface regions have changed since the output surface region was last generated.

As discussed above, in the present embodiments, this is done by comparing signatures representative of the content of the versions of the input surface regions that were used to generate the output surface region in question, to see if the signatures (and thus the input surface regions) have changed.

Although the above embodiments have been described with particular reference to the processing of a given output surface region, as will be appreciated, the process of the present embodiments will be repeated for each output surface region that is required. The output surface regions may be processed in turn or in parallel, as desired (and, e.g., depending upon the processing capabilities of the compositing display controller 20).

The operation of the present embodiments will also correspondingly repeated whenever a new version of the output frame is to be generated, as new versions of the output frame are generated.

In an embodiment, when a new version of the output surface (e.g. a new output frame) is to be generated from the input surfaces, it is first determined if any of the contributing input surfaces have been transformed. If any of the input surfaces are transformed (e.g. resized, moved, rotated, moved forwards or backwards, etc.) between versions of the output surface (e.g. between output frames), then the output surface is simply regenerated from the input surfaces as a whole (i.e. all of the regions of the output surface are re-generated).

Also, an output surface region may be regenerated irrespective of whether it has changed or not, if the output surface region has been unchanged for a selected, threshold number of versions of the output surface (e.g. output frames). To facilitate this, saturating counters that count the number of versions of the output surface (e.g. new frames) that an output surface region has been unchanged for could be stored, if desired. This can help to ensure that erroneous signature matches do not cause erroneous output for an extended period of time.

As will be appreciated by those skilled in the art, when the initial (first) version of an output surface is to be generated (e.g. the first frame in a sequence of output frames is to be generated), then the process will simply generate that output frame without also storing any of the output surface regions in the buffer. Then, when the next version of the output frame (surface) is to be generated, the process will again generate that version of the output frame on a region-by-region basis, but will compare, e.g., the new output surface regions with the previous output surface regions and store any unchanged output surface regions in the output surface buffer and update the output surface region metadata or signature (e.g. bitmap) accordingly. Then, for the next version of the output frame, the operation in the manner of the present embodiments can be performed, i.e. the compositing display controller can, e.g., read the metadata or signature, determine whether to reuse a stored version of the output surface region (if any), and regenerate the output surface regions as required.

The Applicants have further recognised that certain modifications to the above-described operation may be desirable where the output surface is a frame for display, and some form of display modification processing that will affect the data values of the data positions that are provided to the display for display, such as adaptive luminance and backlight scaling, luminance compensation, brightness compensation, image compensation, contrast enhancement, histogram equalisation, histogram stretching, image enhancement, or modifications used for ambient light adjustments, is being used to generate the final output frame that is being provided to the display.

In this case, the signature comparison process for determining whether the surface regions have changed may be modified based on the display compensation operation that is being performed. To do this, the signature generation process is modified either by generating the signatures that are to be compared using only a selected number of the least significant bits of the surface region data values, or by setting the data values for data positions within the surface regions in question to a common value based on the display modification operation that is being performed before generating the signatures that are to be compared for the surface regions in question.

This can then increase the possibility of identifying regions that will in practice be caused to be the same where backlight compensation or another similar process that causes data position values to be saturated is being used.

In the former case, the information regarding the display modification compensation that is being applied is used in the input surface and/or signature generation process to identify data positions within a surface region that will be set (saturated) to a common value as a result of the display modification operation, and then those data positions are set to the same common value (e.g. the saturated, maximum value) before the signature for the surface region in question is generated.

In the latter case, the signatures that are compared for each version of a frame region are generated using only selected, least significant bits (LSB), of the data in each frame region (e.g. R[5:0], G[5:0] and B[5:0] where the frame data is in the form RGB888).

It may also be the case that it is desirable for other purposes to also have a "full" content-indicating signature for the input frame tiles. In this case, two sets of signatures could, for example, be generated, one "full" signature, and another "reduced" signature for the comparison process. Alternatively, the portions of the colours could be split to generate respective separate signatures, such as a first signature for MSB colour (e.g. R[7:4], G[7:4], B[7:4]), a second "mid-colour" signature (e.g. R[3:2], G[3:2], B[3:2]) and a third LSB colour signature (R[1:0], G[1:0], B[1:0]), for example, with the respective "part" signatures, e.g. the LSB colour signature, being used for the comparison process, but then the respective "part" signatures being concatenated to provide a "full" content-indicating signature for the tile where that is required. Other arrangements would, of course, be possible.

In these arrangements therefore, the process will, for example, operate to fetch a frame buffer to be displayed, decompress that frame, generate an appropriate frame histogram and determine therefrom a backlight dimming and luminance compensation to be used (for a given (acceptable) distortion level). The display frame brightness will then be boosted and the backlight level set accordingly (e.g. in the normal fashion for the backlight dimming and luminance compensation operation in question), but then in addition to this, the brightness compensation level will be provided, e.g. to the composition process (to the composition engine) and/or to the signature comparison process.

The so-provided brightness compensation level will then be used, e.g., in the contributing input surface region comparison process, for example, to select the signature comparison arrangement to be used (thus, for example, step 47 in FIG. 9 will be modified to include a step of selecting the signatures to be compared depending upon the brightness compensation level being used).

Other arrangements would, of course, be possible.

In an embodiment, whether the new version of the region of the output surface is written to the buffer for future use is dependent on one or more other factors or criteria, such as the type and/or the complexity of the processing to be performed on the respective region or regions of the one or more input surfaces to generate the output surface region, and/or (relative) properties of the input and output surface regions, such as their (relative) data sizes.

Thus, in an embodiment, the determination of whether to write the new version of the region of the output surface to the buffer is dependent upon the relative sizes (in terms of the data that they contain) of the output surface region and of the input surface region or regions from which the output surface region is derived, e.g. whether the respective region or regions of the one or more input surfaces has/have been downscaled to generate the output surface region, and/or whether the output surface region is more compressed than and/or has a higher compression ratio than the input surface region or regions.

In an embodiment, if the region of the output surface contains less data than the respective region or regions of the one or more input surfaces, the new version of the region of the output surface is written to the buffer as well as being sent for use, e.g. for display on a display device, but if the region of the output surface contains more data than the respective region or regions of the one or more input surfaces, the new version of the region of the output surface is sent for use without writing it to the buffer.

The power and bandwidth overhead for processing the input frame region or regions relative to the power and processing overhead of writing the output region to the buffer (and retrieving it therefrom) may also be used to influence whether to store the output surface in the buffer or not.

The arrangements of the present embodiment can equally be applied to forms of input surface processing and output surface generation that comprise plural processing stages (e.g. in which each processing stage takes an input surface or surfaces and generates a respective output surface for that processing stage). In this case, there may be a sequence of plural processing stages between the initial input surfaces and the final output surface that is provided for use (e.g. for display).

In this case one or more of the plural processing stages that operate to generate the final output surface (e.g. output frame) may have associated buffers and operate in the manner of the present embodiments to store regions of their respective output surfaces in their respective buffer (when it is determined to be appropriate to do that).

The Applicants have recognised that the same principle as described above for determining whether an output surface is likely to change and for storing the output surface if it is determined to be unlikely to change may also be applied to cases where an output surface is compressed before being sent to a display. Further embodiments are therefore contemplated in which the processed output surface is compressed, for example, so as to reduce bandwidth requirements in applications where a processed output surface is transmitted to a remote and/or mobile display device, and the compressed version of the output surface may be stored in addition to or instead of the uncompressed version of the output surface.

In an example, when an output surface region is to be sent to a remote and/or mobile display device by a data processing system, a region or regions of respective one or more input surfaces is/are read from memory, then processed and/or composited to generate the final output surface region. The final output surface region is then compressed and transmitted to the remote and/or mobile display device via, e.g. a mobile display interface.

The compression may be performed according to any suitable compression standard, but in an embodiment, Display Stream Compression (DSC) is used, which provides computationally cheap and low latency compression with a predetermined bit rate. An exemplary DSC algorithm uses a Delta Pulse Code Modulation (DPCM) scheme and an Indexed Colour History (ICH) technique. DSC is commonly line-based and is performed along raster lines, thus the surface regions that are considered in the manner of the present embodiments may be lines.

In an embodiment where an output surface is compressed, e.g. by DSC, before being sent to a display device, if one or more regions of an output surface is determined to be unlikely to change, the compressed one or more regions can be written to a buffer for reuse. For example, if a region or regions of respective one or more input surfaces that together form an output surface region is/are determined to be unlikely to change, in addition to or instead of storing the output surface region, the compressed version (e.g. by DSC) of the output surface region may be stored. By storing the compressed version instead of the uncompressed version of the output surface region, it is possible to reduce bandwidth and memory usage for the data processing system.

When a subsequent output surface region is to be generated, if it is determined to be similar to the output surface region the compressed version of which is stored, the stored compressed version of the output surface region can be fetched from the buffer and reused instead of generating and compressing the subsequent output surface region. It is therefore possible to reduce the computational requirement on the data processing system.

In the embodiment, the determination of whether an output surface region is likely to change can be performed using any techniques and any one or more optional features described herein. In particular, signatures of input surface regions and/or output surface regions can be compared.

In cases where line-based DSC is used for compressing output surfaces, the regions of an input or output surface that are considered in the present embodiment each corresponds to a raster line or a portion of a line, and line signatures are used instead. Where a raster line of an output surface to be compressed comprises, e.g. a first portion and a second portion, if both the first portion and the second portion are determined to be unlikely to change, the whole compressed line of data can be written to a buffer for later reuse.

However, in a case where only a portion or portions (but not all) of the line is/are unlikely to change, it may still be desirable to write a whole line of compressed data in some embodiments. In an example, if, e.g. the first portion of the line is determined to have changed while the second portion of the line is determined not to have changed, the compressed line can be fetched from the buffer for reuse. The compressed line is decompressed, and the decompressed second portion is combined with the new first portion, and then the combined portions are compressed and sent to the display.

Alternatively or additionally, the line of data can be compressed and/or stored as separate portions. In this case, if the first portion is determined not to have changed but the second portion is determined to have changed, the compressed first portion can be fetched from the buffer and sent directly to the display. Then, only the new second portion needs to be encoded (compressed) before being sent.

However, if the encoding (compressing) and decoding (decompressing) of the second portion requires data from the first portion, then the compressed first portion is fetched from the buffer and decompressed, and then the (unchanged) first portion and the new second portion are compressed and sent to the display. Similarly, if the first portion is determined to have changed but the second portion is determined not to have changed, the compressed first and second portions are fetched from the buffer, and the first portion is decompressed so that the second portion can be decompressed. Then, the new first portion and the (unchanged) second portion can be compressed and sent to the display.

In a further example, when the first portion is determined to be likely to change while the second portion is determined to be unlikely to change, the uncompressed second portion only may be stored in a buffer for reuse. Then, in a subsequent cycle, the uncompressed second portion is fetched from the buffer and combined with the new first portion, and the combined new first portion and unchanged second portion are compressed and sent to the display.

Further embodiments and alternatives have been contemplated in which, for example, a line of data comprises three, four or more portions, and/or in which the plural portions are stored as different combinations of compressed or uncompressed portions.

As can be seen, the storing of compressed output surface regions may be performed in addition to or instead of writing an uncompressed version of the output surface region. This can be particularly useful in cases where, for example, an output surface is compressed before being sent to a display. In this case, a compressed version of an output surface region may be reused and sent directly to the display for cycles in which the output surface region has not changed.

The same principle as described above for multi-staged processing may also be applied to cases where an output surface is generated from plural input surfaces, where different ones of the plural input surfaces may update at different frequencies.

Further embodiments are therefore contemplated in which the likelihood of change for a region is assessed in respect of an individual one or a group (subset) of the plural input surfaces that together generate the final output surface. This more readily enables regions of the plural input surfaces that are unlikely to change to be identified and processed accordingly.

Thus, in an embodiment, where an output surface region is generated from respective regions of at least three input surfaces, respective input surfaces that are unlikely to change are grouped together in one or more subsets, and in particular, input surfaces that change at the same or similar rate are grouped together in the same subset. A subset comprises respective regions of two or more, but not all, of the plural input surfaces that are to contribute to the overall, "final", output surface.

An intermediate output surface region is then generated from respective regions of the subset of the plural input surfaces. (If the plural input surfaces are grouped into more than one subset, an intermediate output surface region may be generated for each subset.) The intermediate output surface region is a composition of the respective regions of the subset of input surfaces. The final, overall, version of the output surface region is then generated by compositing the intermediate output surface region and respective regions of the remaining input surfaces that do not belong to the subset.

Figure 12:
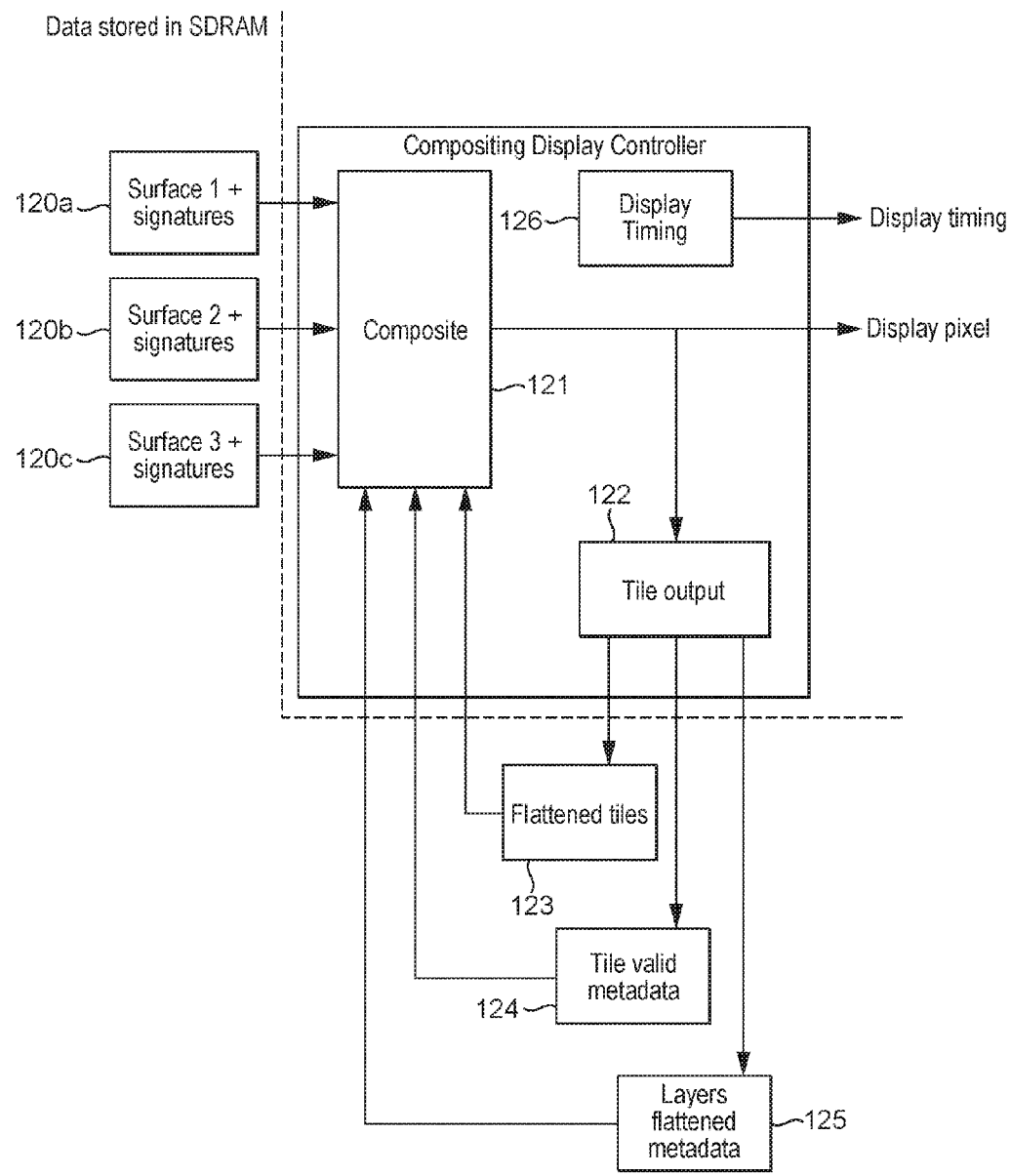
FIG. 12 is a diagram illustrating a frame buffer composition process according to a further embodiment.

For example, FIG. 12 schematically illustrates a composition process according to the present embodiment, in which a first input surface 120*a*, a second input surface 120*b* and a third input surface 120*c* undergo composition at block 121 to generate an overall output surface (not shown).

In the example, the first input surface 120*a* is the user interface (UI) of the overall output surface and the second input surface 120*b* is the UI back drop, both of which change infrequently. The third input surface 120*c* is a video playing in a Window, thus data of this input surface changes frequently. It is therefore desirable, in the present example, to group the first and second input surfaces 120*a*, 120*b* into a subset, and generate intermediate output surface regions by compositing respective regions of the first and second input surfaces 120*a* and 120*b*.

For each intermediate output surface region, if it is determined that the intermediate region is unlikely to change, the intermediate output surface region is written, by tile output 122, to a "flattened tile" buffer 123 to be reused for subsequent output surfaces. The tile output 122 also writes metadata to tile valid metadata buffer 124 to indicate that the intermediate output surface region is valid, for example by setting a valid flag. Furthermore, the tile output 122 writes metadata to "layers flattened" metadata buffer 125 to identify which of the plural input surfaces are used to generate the stored intermediate output surface region. The flattened tiles buffer 123, tile valid metadata buffer 124 and layers flattened metadata buffer 125 are shown here as separate buffers for illustration purposes only. In other embodiments, these buffers may be provided as a single memory unit or two or more separate memory units as desired.

During the next cycle, with respect to an output surface region, flattened tiles buffer 123, tile valid metadata buffer 124 and layers flattened metadata buffer 125 are checked. If a valid intermediate output surface region (which comprises the respective regions of the first and second input surfaces 120*a*, 120*b*) is found, and it is determined that the respective regions of the first and second input surfaces 120*a*, 120*b* have not changed, the stored intermediate output surface region is retrieved, and used for compositing with the respective region of the third input surface 120*c* to generate the overall, final version of the output surface region.

In this way, even when the third input surface 120*c* is determined to have changed, it is still possible to eliminate some of the read transactions and processing by using the intermediate output frame region formed from the first and second input surfaces 120*a*, 120*b*.

If either one or both of the first and second input surfaces 120*a*, 120*b* has/have changed, the tile valid metadata buffer 124 is updated to invalidate the stored intermediate output surface region.

In an additional or alternative embodiment, multiple intermediate and final versions of an output surface region are generated and written to memory. The multiple versions can have overlapping (and common) input surfaces. For example, an intermediate output surface from respective regions of first and second input surfaces, and an intermediate output surface from respective regions of first, second and third input surfaces (or a final, overall output surface if there are only three input surfaces) could be generated. This then allows the most suitable surface regions to be selected and used during the processing of the next frame.

For example, in the example of FIG. 12, the first and second input surfaces 120*a*, 120*b* both change infrequently, while the third input surface 120*c* is updated more frequently, e.g. at ⅓ of the frequency of the display refresh rate.

In this example, it is assumed that the first input surface 120*a* and the second input surface 120*b* do not change for several frames. At this point, only an intermediate output surface regions generated from respective regions of the first and second input surfaces 120*a*, 120*b* are stored.

For a first subsequent frame, for each overall output surface region an intermediate output surface region and a corresponding region of the third input surface 120*c* are fetched. The two surface regions are composited and the final version of the output surface region is output to the display and also written to memory. For this frame, two surface regions (the intermediate version and the region of the third input surface 120c) are read and one surface region (the final version) is written.

For the second subsequent frame, the stored final version of the output surface region is fetched and displayed. For this frame, only one surface region read is needed.

For the third subsequent frame, again, the stored final version of the output surface region is fetched and displayed. For this frame, only one surface region read is needed.

For the fourth subsequent frame, the third input surface 120c has updated. The intermediate output surface region is fetched and a corresponding region of the updated third input surface 120c is fetched. The two surface regions are composited and the final version of the output surface region is output to the display and written to memory.

In this scenario, if no output surface was written to memory, there would be an average of three surface fetches for every display refresh over the four frames (all three input surfaces must be fetched for each frame).

In the previous examples, in which the final version of the output surface is written to memory only when all three input surfaces are determined to be unlikely to change, there would be an average of two surface fetches for every display refresh.

In the present example, in which the final version of the output surface and an intermediate output surface can be written to memory, there is an average of 1.66 surface fetches for every display refresh.

As can be seen, the generation and storing of intermediate output surface regions, generated from respective regions of a subset of plural input surfaces, may be performed in addition to writing a final version of the output surface region generated from respective regions of all of the plural input surfaces. This can be particularly useful in cases where, for example, one of the plural input surfaces changes frequently while the remaining input surfaces change less frequently. In this case, an intermediate output surface region may be reused for cycles in which the one input surface region has changed but the subset of the remaining plural input surface regions has not, while the full version of the output surface region may be reused for cycles in which the regions of all of the plural input surfaces have not changed.

As will be appreciated from the above, the technology described herein, in some embodiments at least, facilitates selecting between either using direct display controller composition or the reuse of output surface regions from a frame buffer on an output surface region-by-output surface region basis.

For output surface regions that are updated more frequently, direct display controller composition without also storing those output surface regions in a frame buffer is used (which the Applicants have recognised will be more efficient in those circumstances).

On the other hand, for output surface regions that are static or infrequently updated, stored output surface regions from a frame buffer are displayed instead (where possible). This can then avoid write traffic and processing for regions of an output surface that don't actually change from one version of the output surface to the next (e.g. in the case of a user interface).

This is achieved, in some embodiments of the technology described herein at least, by the compositing display controller determining whether an output surface region has been unchanged for a period, and if it has, then storing the output surface region to a frame buffer. Then, for the subsequent frame, checks are performed to see if the output surface region could have changed. If there is no change the stored version of the output surface region is reused, but if there is a change in the output surface region, the output surface region is regenerated.

The technology described herein, in an embodiment at least, effectively dynamically selects on an output surface-by-output surface region basis the composition scheme (frame buffer or direct composition) to use so as to minimise bandwidth and power consumption. It can reduce output frame display composition to just a frame buffer fetch for static areas of the output surface and direct composition for regions that are updated rapidly.

This operation can save a significant amount of bandwidth and power consumption for the output surface displaying operation.

Indeed, the Applicant has found that for standard mobile use cases, the technology described herein, in some embodiments at least, can save ~800 MB/s and ~217 mW compositing data compared to prior art systems.

For example, studies have shown that with mobile device use, most of the time (around 75%) is spent on User Interface (UI) generation and composition, whereas around 15% is spent on basic 3D apps and 3D composition and the remaining 10% is spent on less basic 3D apps and games and their composition. This means that quite often portions of the display are static.

Taking the assumption that the energy used to transfer 1 bit of data to external memory consumes $3.25\ e^{-11}$ J, then, for example, for a static home screen being refreshed at 60 frames per second and composited from two 2560×1454 surfaces, the bandwidth for normal frame buffer composition will be 3.4 GB/s, and the bandwidth for normal direct composition will be 1.7 GB/s, but the bandwidth using the technology described herein could be 0.85 GB/s, thereby giving a bandwidth reduction of 0.85 GB/s and a power reduction of 230 mW, compared to fully direct composition. For video in a window with a 30% tile update rate and composited from two 2560×1600 surfaces, again the normal frame buffer composition bandwidth will be 3.6 GB/s, and the direct composition bandwidth will be 1.8 GB/s, but the bandwidth for the technology described herein could be 1.17 GB/s, thereby giving a bandwidth reduction of 0.63 GB/s and a power reduction of 176 mW compared to fully direct composition. For full frame video in which it is assumed that 20% of the tiles are the same, and composited from two 2560×1600 surfaces, the frame buffer composition bandwidth would be 3.6 GB/s and the direct composition bandwidth would be 1.8 GB/s, but the bandwidth using the technology described herein could be 1.44 GB/s, thereby giving a bandwidth reduction of 0.36 GB/s and a power reduction of 100 mW compared to fully direct composition.

The foregoing detailed description has been presented for the purposes of illustration and description. It is not intended to be exhaustive or to limit the technology to the precise form disclosed. Many modification and variations are possible in the light of the above teaching. The described embodiments were chosen in order to best explain the principles of the technology and its practical application, to thereby enable others skilled in the art to best utilise the technology, in various embodiments and with various modifications as are suited to the particular use contemplated. It is intended that the scope be defined by the claims appended hereto.

What is claimed is:

1. A method of providing an output surface, the output surface comprising one or more regions that together form the output surface, each respective region of the output surface being generated from a respective region or regions of one or more input surfaces, the method comprising:
when a new version of an output surface is to be provided, for at least one region of the output surface:
checking whether a previously generated version for the at least one region of the output surface is stored in a buffer;
and
when a previously generated version for the at least one region of the output surface is not stored in the buffer:
reading in the respective region or regions of the one or more input surfaces from which the at least one region of the output surface is to be generated, and generating a new version of the at least one region of the output surface from the respective region or regions of the one or more input surfaces;
determining whether the at least one region of the output surface for which a previously generated version for the at least one region of the output surface is not stored in the buffer is likely to change; and
when it is determined that the at least one region of the output surface is unlikely to change:
sending the new version of the at least one region of the output surface for use and writing the new version of the at least one region of the output surface for which it was determined that the at least one region of the output surface was unlikely to change to the buffer for which it was checked whether a previously generated version for the at least one region of the output surface is stored in and that a previously generated version for the at least one region of the output surface is not stored in.

2. A method as claimed in claim 1, comprising:
when a previously generated version for the at least one region of the output surface is not stored in the buffer and when the at least one region of the output surface is determined to be likely to change, sending the new version of the at least one region of the output surface for use without storing it in the buffer for future use.

3. A method as claimed in claim 1, comprising:
when a previously generated version for the at least one region of the output surface is stored in the buffer:
determining whether the region or regions of the one or more input surfaces that contribute to the at least one region of the output surface has/have changed; and
when it is determined that the respective region or regions of the one or more input surfaces has/have not changed:
reading the previous version of the at least one region of the output surface from the buffer and sending it for use.

4. A method as claimed in claim 1, comprising:
when a previously generated version for the at least one region of the output surface is stored in the buffer:
determining whether the region or regions of the one or more input surfaces that contribute to the at least one region of the output surface has/have changed; and
when it is determined that the respective region or regions of the one or more input surfaces has/have changed:
reading in the respective contributing region or regions of the one or more input surfaces and generating a new version of the at least one region of the output surface from the respective contributing region or regions of the one or more input surfaces; and
sending the new version of the at least one region of the output surface for use without storing it in the buffer for future use.

5. A method as claimed in claim 1, wherein checking whether a previously generated version for the at least one region of the output surface is stored in the buffer comprises checking stored data which indicates whether or not a previously generated version for the at least one region of the output surface is stored in the buffer.

6. A method as claimed in claim 1, wherein:
the output surface is an output frame for display, and a display modification operation is performed on the output frame to modify the output frame data values before it is provided to a display for display; and
the method further comprises:
modifying the step of checking whether a surface region or regions have changed based on the display modification operation being performed.

7. A method as claimed in claim 1, further comprising:
comparing the amount of data required to store an output surface region in the buffer to the amount of data for the respective region or regions of the one or more input surfaces from which the region of the output surface is to be generated.

8. A method as claimed in claim 1, wherein the method is implemented in a data processing system that includes plural processing stages that together generate a final output surface for use, and the output surface is an output surface of an intermediate processing stage of the plurality of processing stages, and the input surface or surfaces are input surfaces for that intermediate processing stage.

9. A method as claimed in claim 1, wherein the output surface is to be generated from respective regions of a set of plural input surfaces, and the method comprises, when a new version of the output surface is to be provided, for at least one region of the output surface:
reading in the respective regions from which the output surface region is to be generated of at least one subset of the set of plural input surfaces that the output surface is to be generated from;
determining whether the respective regions of the at least one subset of input surfaces are likely to change; and
when it is determined that the respective regions of the at least one subset of input surfaces are unlikely to change:
generating an intermediate output surface region from the respective regions of the input surfaces of the at least one subset of input surfaces; and
writing the intermediate output surface region to a buffer.

10. A computer readable medium having software code stored thereon which, when executed, causes the method of claim 1 to be performed.

11. A system for providing an output surface, the output surface comprising one or more regions that together form the output surface, each respective region of the output surface being generated from a respective region or regions of one or more input surfaces, the system comprising:
a buffer; and
a compositing display controller;
and wherein the compositing display controller is capable of, when a new version of an output surface is to be provided, performing the following steps for at least one region of the output surface:
check whether a previously generated version for the at least one region of the output surface is stored in the buffer; and when a previously generated version for the at least one region of the output surface is not stored in the buffer:
  read in the respective region or regions of the one or more input surfaces from which the at least one region of the output surface is to be generated, and generate a new version of the at least one region of the output surface from the respective region or regions of the one or more input surfaces;
  determine whether the at least one region of the output surface for which a previously generated version for the at least one region of the output surface is not stored in the buffer is likely to change;
  and when it is determined that the at least one region of the output surface is unlikely to change:
    send the new version of the at least one region of the output surface for use and write the new version of the at least one region of the output surface for which it was determined that the at least one region of the output surface was unlikely to change to the buffer that was checked whether a previously generated version for the at least one region of the output surface is stored in and that a previously generated version for the at least one region of the output surface is not stored in.

12. A system as claimed in claim 11, wherein, the compositing display controller is capable of:
  when a previously generated version for the at least one region of the output surface is not stored in the buffer and when the at least one region of the output surface is determined to be likely to change, sending the new version of the at least one region of the output surface for use without storing it in the buffer for future use.

13. A system as claimed in claim 11, wherein, the compositing display controller is capable of:
  when a previously generated version for the at least one region of the output surface is stored in the buffer:
    determining whether the region or regions of the one or more input surfaces that contribute to the at least one region of the output surface has/have changed; and
    when it is determined that the region or regions of the one or more input surfaces has/have not changed:
      reading the previous version of the at least one region of the output surface from the buffer and send it for use.

14. A system as claimed in claim 11, wherein the compositing display controller is capable of:
  when a previously generated version for the at least one region of the output surface is stored in the buffer,
  determining whether the region or regions of the one or more input surfaces that contribute to the at least one region of the output surface has/have changed; and
  when it is determined that the respective region or regions of the one or more input surfaces has/have changed:
    reading in the respective contributing region or regions of the one or more input surfaces and generate a new version of the at least one region of the output surface from the respective contributing region or regions of the one or more input surfaces; and
    sending the new version of the at least one region of the output surface for use without storing it in the buffer for future use.

15. A system as claimed in claim 11, wherein the compositing display controller, when it checks whether a previously generated version for the at least one region of the output surface is stored in the buffer, checks stored data which indicates whether or not the at least one region of the output surface is stored in the buffer.

16. A system as claimed in claim 11, wherein:
  the compositing display controller further comprises processing circuitry capable of, when the output surface is an output frame for display, and a display modification operation is performed on the output frame to modify the output frame data values before it is provided to a display for display:
  modifying the step of checking whether a surface region or regions have changed based on the display modification operation being performed.

17. A system as claimed in claim 11, wherein the compositing display controller determines a comparison of the amount of data required to store an output surface region in the buffer compared to the amount of data for the respective region or regions of the one or more input surfaces from which the region of the output surface is to be generated.

18. A system as claimed in claim 11, wherein the system is a data processing system that includes plural processing stages that together generate a final output surface for use, and the output surface is an output surface of an intermediate processing stage of the plurality of processing stages, and the input surface or surfaces are input surfaces for that intermediate processing stage.

19. A system as claimed in claim 11, wherein the compositing display controller is capable of, when the output surface is to be generated from respective regions of a set of plural input surfaces, and a new version of the output surface is to be provided, for at least one region of the output surface:
  reading in the respective regions from which the output surface region is to be generated of at least one subset of the set of plural input surfaces that the output surface is to be generated from;
  determining whether the respective regions of the at least one subset of input surfaces are likely to change; and
  when it is determined that the respective regions of the at least one subset of input surfaces are unlikely to change:
    generating an intermediate output surface region from the respective regions of the input surfaces of the at least one subset of input surfaces; and
    writing the intermediate output surface region to a buffer.

20. A compositing display controller for providing an output surface, the compositing display controller:
  generating respective output surface regions that together form the output surface, each respective region of the output surface being generated from a respective region or regions of one or more input surfaces; and
  being capable of, when a new version of an output surface is to be provided, performing the following steps for at least one region of the output surface:
  determine whether to reuse a previously stored version for the at least one region of the output surface or whether to generate a new version of the at least one region of the output surface from the respective region or regions of the one or more input surfaces;
  either send the previously stored version for the at least one region of the output surface for use or generate a new version of the at least one region of the output surface from the respective region or regions of the one or more input surfaces and send the generated new version of at least one region of the output surface for use, in accordance with the determination, and
  when it is determined to generate a new version of the at least one region of the output surface from the respective regions of the one or more input surfaces:

determine whether the at least one region of the output surface for which it was determined to generate the new version of the at least one region of the output surface is likely change, wherein determining whether the at least one region of the output surface is likely to change comprises determining whether at least one of the following have changed prior to determining to generate the new version of the at least one region of the output surface:

the at least one region of the output surface; and/or the respective region or regions of the one or more input surfaces that are to contribute to the at least one region of the output surface.

* * * * *